United States Patent
Gourlay et al.

(10) Patent No.: US 9,002,525 B2
(45) Date of Patent: *Apr. 7, 2015

(54) UPDATING CONTROL SOFTWARE ON A NETWORK-CONNECTED HVAC CONTROLLER

(71) Applicant: Nest Labs, Inc., Palo Alto, CA (US)

(72) Inventors: Alastair R. Gourlay, Boulder Creek, CA (US); David A. Bourne, San Francisco, CA (US); Grant M. Erickson, Sunnyvale, CA (US); Richard J. Schultz, Mountain View, CA (US); David Sloo, Menlo Park, CA (US); Jonathan Solnit, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/890,344

(22) Filed: May 9, 2013

(65) Prior Publication Data
US 2014/0096126 A1    Apr. 3, 2014

Related U.S. Application Data

(63) Continuation of application No. 13/632,133, filed on Sep. 30, 2012, now Pat. No. 8,594,850.

(51) Int. Cl.
*G01M 1/38* (2006.01)
*G05B 13/00* (2006.01)
(Continued)

(52) U.S. Cl.
CPC .. *G06F 8/65* (2013.01); *G06F 8/61* (2013.01); *G05B 15/02* (2013.01); *F22B 3/00* (2013.01); *G06F 9/44* (2013.01); *G05B 2219/23306* (2013.01); *G05B 2219/2614* (2013.01)

(58) Field of Classification Search
CPC ............ B60H 1/00; F22B 3/00; G05B 13/00; G05B 23/00; G05B 15/00; G06F 8/65; G06F 9/44; G06F 8/61
USPC ....... 700/276–278, 299–300; 236/1 B, 1 E, 3, 236/101 C; 165/11.1–11.2, 200, 203, 270; 717/122, 138, 170–174, 177–178; 707/638, 695, 806; 715/229
See application file for complete search history.

(56) References Cited

U.S. PATENT DOCUMENTS

| 4,948,040 A | 8/1990 | Kobayashi et al. |
| 5,065,813 A | 11/1991 | Berkeley et al. |

(Continued)

FOREIGN PATENT DOCUMENTS

| EP | 447458 | 9/1991 |
| EP | 510807 | 10/1992 |

(Continued)

OTHER PUBLICATIONS

Aprilaire Electronic Thermostats Model 8355, User's Manual, Research Products Corporation, Dec. 2000, 16 pages.

(Continued)

*Primary Examiner* — Ramesh Patel
(74) *Attorney, Agent, or Firm* — Kilpatrick Townsend & Stockton LLP

(57) ABSTRACT

Apparatus, systems, methods, and computer program products are disclosed for providing software updates to client devices. A client device (such as a thermostat) executes software to perform one or more functionalities of the device. Upon receiving an indicating that a software update is available, the device waits to download the software update until pre-download conditions are satisfied. Once the software update is downloaded, the device then waits to install the software update until pre-install conditions are satisfied. If the software update is non-critical and received during an initial installation of the device, the software update may not be installed until after installation of the device is complete. If the device is a thermostat, the device may delay installation of the software update until a controlled HVAC system in inactive. Control of the HVAC system may be disabled during installation of the software update.

20 Claims, 15 Drawing Sheets

(51) Int. Cl.

| | | |
|---|---|---|
| *G05B 15/00* | (2006.01) | |
| *G05B 23/00* | (2006.01) | |
| *G06F 9/445* | (2006.01) | |
| *G05B 15/02* | (2006.01) | |
| *G06F 9/44* | (2006.01) | |
| *B60H 1/00* | (2006.01) | |
| *F22B 3/00* | (2006.01) | |

(56) References Cited

U.S. PATENT DOCUMENTS

| | | | |
|---|---|---|---|
| 5,161,606 A | 11/1992 | Berkeley et al. | |
| 5,224,648 A | 7/1993 | Simon et al. | |
| 5,452,762 A | 9/1995 | Zillner, Jr. | |
| 5,467,921 A | 11/1995 | Shreeve et al. | |
| 5,950,709 A | 9/1999 | Krueger et al. | |
| 6,102,749 A | 8/2000 | Lynn et al. | |
| 6,453,687 B2 | 9/2002 | Sharood et al. | |
| 6,513,723 B1 | 2/2003 | Mueller et al. | |
| 6,519,509 B1 | 2/2003 | Nierlich et al. | |
| 6,619,055 B1 | 9/2003 | Addy | |
| 6,798,341 B1 | 9/2004 | Eckel et al. | |
| 6,851,621 B1 * | 2/2005 | Wacker et al. | 236/51 |
| 6,851,967 B2 | 2/2005 | Miyoshi et al. | |
| 6,891,838 B1 | 5/2005 | Petite et al. | |
| 6,909,921 B1 | 6/2005 | Bilger | |
| 6,963,285 B2 * | 11/2005 | Fischer et al. | 340/635 |
| 6,997,390 B2 | 2/2006 | Alles | |
| 7,055,759 B2 * | 6/2006 | Wacker et al. | 236/51 |
| 7,083,109 B2 | 8/2006 | Pouchak | |
| 7,135,965 B2 | 11/2006 | Chapman, Jr. et al. | |
| 7,156,318 B1 | 1/2007 | Rosen | |
| 7,167,079 B2 | 1/2007 | Smyth et al. | |
| 7,181,317 B2 | 2/2007 | Amundson et al. | |
| 7,222,800 B2 * | 5/2007 | Wruck | 236/51 |
| 7,289,887 B2 | 10/2007 | Rodgers | |
| 7,360,370 B2 | 4/2008 | Shah et al. | |
| 7,434,742 B2 | 10/2008 | Mueller et al. | |
| 7,460,690 B2 | 12/2008 | Cohen et al. | |
| 7,469,550 B2 | 12/2008 | Chapman, Jr. et al. | |
| 7,516,106 B2 * | 4/2009 | Ehlers et al. | 705/412 |
| 7,537,171 B2 | 5/2009 | Mueller et al. | |
| 7,562,536 B2 | 7/2009 | Harrod et al. | |
| 7,565,813 B2 * | 7/2009 | Pouchak | 62/126 |
| 7,571,865 B2 | 8/2009 | Nicodem et al. | |
| 7,634,504 B2 | 12/2009 | Amundson | |
| 7,702,424 B2 | 4/2010 | Cannon et al. | |
| 7,703,694 B2 | 4/2010 | Mueller et al. | |
| D614,976 S | 5/2010 | Skafdrup et al. | |
| 7,748,640 B2 | 7/2010 | Roher et al. | |
| 7,844,764 B2 | 11/2010 | Williams | |
| 7,847,681 B2 | 12/2010 | Singhal et al. | |
| 7,904,209 B2 | 3/2011 | Podgorny et al. | |
| 8,037,022 B2 | 10/2011 | Rahman et al. | |
| 8,067,912 B2 | 11/2011 | Mullin | |
| 8,131,207 B2 | 3/2012 | Hwang et al. | |
| 8,140,062 B1 * | 3/2012 | Hildner et al. | 455/418 |
| 8,183,995 B2 * | 5/2012 | Wang et al. | 340/539.1 |
| 8,373,538 B1 * | 2/2013 | Hildner et al. | 340/3.1 |
| 8,594,850 B1 | 11/2013 | Gourlay et al. | |
| 2003/0231001 A1 | 12/2003 | Bruning | |
| 2004/0095237 A1 | 5/2004 | Chen et al. | |
| 2004/0130454 A1 | 7/2004 | Barton | |
| 2004/0193324 A1 | 9/2004 | Hoog et al. | |
| 2004/0238651 A1 | 12/2004 | Juntunen et al. | |
| 2005/0040247 A1 * | 2/2005 | Pouchak | 236/44 C |
| 2005/0040249 A1 * | 2/2005 | Wacker et al. | 236/51 |
| 2005/0040250 A1 | 2/2005 | Wruck | |
| 2005/0043907 A1 | 2/2005 | Eckel et al. | |
| 2005/0055432 A1 | 3/2005 | Rodgers | |
| 2005/0159846 A1 | 7/2005 | Van Ostrand et al. | |
| 2005/0194456 A1 | 9/2005 | Tessier et al. | |
| 2007/0045441 A1 | 3/2007 | Ashworth et al. | |
| 2007/0114295 A1 | 5/2007 | Jenkins | |
| 2007/0115902 A1 | 5/2007 | Shamoon et al. | |
| 2007/0157639 A1 | 7/2007 | Harrod | |
| 2007/0208461 A1 | 9/2007 | Chase | |
| 2007/0221741 A1 | 9/2007 | Wagner et al. | |
| 2007/0228183 A1 | 10/2007 | Kennedy et al. | |
| 2008/0015740 A1 | 1/2008 | Osann | |
| 2008/0015742 A1 | 1/2008 | Kulyk et al. | |
| 2008/0099568 A1 | 5/2008 | Nicodem et al. | |
| 2008/0128523 A1 | 6/2008 | Hoglund et al. | |
| 2008/0161977 A1 | 7/2008 | Takach et al. | |
| 2008/0272934 A1 * | 11/2008 | Wang et al. | 340/870.11 |
| 2009/0057425 A1 | 3/2009 | Sullivan et al. | |
| 2009/0140056 A1 | 6/2009 | Leen | |
| 2009/0140064 A1 | 6/2009 | Schultz et al. | |
| 2009/0140065 A1 | 6/2009 | Juntunen et al. | |
| 2009/0143879 A1 | 6/2009 | Amundson et al. | |
| 2009/0143880 A1 | 6/2009 | Amundson et al. | |
| 2009/0194601 A1 | 8/2009 | Flohr | |
| 2009/0261174 A1 | 10/2009 | Butler et al. | |
| 2010/0114382 A1 | 5/2010 | Ha et al. | |
| 2010/0131112 A1 | 5/2010 | Amundson et al. | |
| 2010/0163633 A1 | 7/2010 | Barrett et al. | |
| 2010/0163635 A1 | 7/2010 | Ye | |
| 2010/0168924 A1 | 7/2010 | Tessier et al. | |
| 2010/0298985 A1 | 11/2010 | Hess et al. | |
| 2011/0001812 A1 | 1/2011 | Kang et al. | |
| 2011/0151837 A1 | 6/2011 | Winbush, III | |
| 2012/0233478 A1 * | 9/2012 | Mucignat et al. | 713/320 |
| 2012/0248211 A1 | 10/2012 | Warren et al. | |

FOREIGN PATENT DOCUMENTS

| | | |
|---|---|---|
| JP | 09298780 | 11/1997 |
| SI | 20556 | 10/2001 |
| WO | 2005019740 | 3/2005 |
| WO | 2007027554 | 3/2007 |
| WO | 2008054938 | 5/2008 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Thermostat Installation Manual, Jun. 29, 2011, 20 pages.
Ecobee Smart Thermostat User Manual, May 11, 2010, 20 pages.
Honeywell Installation Guide, FocusPRO TH6000 Series, Honeywell International, Inc., Jan. 5, 2012, 24 pages.
Honeywell Operating Manual, FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Installation and Start-Up Instructions Evolution Control SYSTXB-BUID01, Bryant Heating & Cooling Systems, 2004, 12 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
TB-PAC, TB-PHP, Base Series Programmable Thermostats, Carrier Corp, May 14, 2012, 8 pages.

(56) References Cited

OTHER PUBLICATIONS

TCONT600AF11MA Programmable Comfort Control, Installation Instructions Trane, 2006, 16 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
TZONE950AC52ZA ComfortLink II Installation Guide, Trane, 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat, Honeywell International, Inc. Operating Manual, Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
XL950 ComfortLink II Thermostat Installation Guide, Trane, 2011, 32 pages.
U.S. Appl. No. 13/632,133, Non-Final Office Action mailed on Jan. 3, 2013, 9 pages.
U.S. Appl. No. 13/632,133, Notice of Allowance mailed on Oct. 11, 2013, 10 pages.
U.S. Appl. No. 13/632,133, Notice of Allowance mailed on Mar. 11, 2013, 7 pages.
U.S. Appl. No. 13/632,133, Notice of Allowance mailed on Jun. 3, 2013, 8 pages.
Bourke, Server Load Balancing, O'Reilly & Associates, Inc., Aug. 2001, 182 pages.
Bryant, SYSTXBBUIDO1 Evolution Control Installation Instructions, Feb. 2004, 12 pages.
White et al., A Conceptual Model for Simulation Load Balancing, Proceedings of the 1998 Spring Simulation Interoperability Workshop, 1998, pp. 1-7.

\* cited by examiner

UPDATING CONTROL SOFTWARE ON A NETWORK-CONNECTED HVAC CONTROLLER

CROSS-REFERENCE TO RELATED APPLICATIONS

The present application is a continuation application of U.S. application Ser. No. 13/632,133 filed on Sep. 30, 2012, which is incorporated by reference herein in its entirety for all purposes.

FIELD

This patent specification relates to systems, methods, and related computer program products for performing software updates. More particularly, this patent specification relates to techniques for performing user-friendly software updates in potentially power-limited network-connected electronic devices.

BACKGROUND

Many, if not most, electronic devices in use today have installed thereon some type of software for facilitating operation of the electronic device. Such software may include operating systems, such as the Windows operating system by Microsoft Corp. of Redmond, Wash. Such software typically also includes application software that executes over the operating system and provides additional device functionality, such as the Office software also by Microsoft Corp. Incremental changes to such software (the operation system and/or application software) are often made by the software developers to provide improvements, address deficiencies, or for other reasons. These changes are commonly propagated to the user of the software over wired or wireless networks so that the user may revise their software with the latest software upgrades provided by the developers.

While certain mechanisms for updating software on an electronic device are currently available, substantial disadvantages can arise for certain known methods in that they tend to be a one-size-fits-all approach that does not take into account the nature of the device that is being updated in terms of the problems, pitfalls, inconveniences, and even dangers that can arise for that particular type of device. For example, many such known software updating mechanisms are typically implemented in environments whereby the electronic device is either constantly connected to a reliable power source (e.g., a desktop computer connected to an AC power source) or may easily be connected to a reliable power source via minimal user interaction (e.g., a user may plug a portable electronic device such as a smartphone into an AC power source). Modern day techniques, however, have yet to consider much less address environments whereby the electronic device has limited access to power and users may be significantly hindered in providing reliable access to power. Even though electronic devices may exist in such environments, like their power-satisfied cousins such devices may similarly derive various benefits from reliably receiving and installing software updates. While one or more of the embodiments described hereinbelow have been found to be particularly advantageous in the context of a network-connected thermostat designed to control an HVAC system, it is to be appreciated that the scope of the present teachings is not so limited, and can advantageously be applied across a broad array of smart-home devices in which one or more similar issues may be faced.

SUMMARY

Various techniques for providing software updates are disclosed herein. While such techniques may be implemented in various electronic devices across a variety of computing environments, some techniques may be particularly well-suited for environments where one or more of the electronic devices have relatively low power capacity and limited access to power sources. By way of example and not by way of limitation, thermostats provided in structured environments may have limited amounts of power capacity (e.g., a rechargeable lithium-ion battery) that is replenished using power stealing techniques that 'steal' or otherwise acquire power from HVAC systems which the thermostats are coupled to control. While these power stealing may advantageously replenish power stores as it is consumed by the thermostat, in some cases thermostats may, to provide superior functionality and user experience, consume power at a higher rate than that replenished. Further, in the particular example of thermostats installed in structured environments, a user typically cannot obviate the power limitations by simply 'plugging in' the device to a power source.

Updating software on electronic devices may spread the spectrum of complexity from a trivial to daunting. At one end of the spectrum, a software update may comprise almost superficial changes to a single software application or process executing or executable on the electronic device. At the other end of the spectrum, a software update may comprise replacement of an entire operating system of the electronic device. Regardless of the situation, however, common elements to a reliable update process exist, including the electronic device downloading or otherwise acquiring the software update, and installing the software update.

Techniques for reliably downloading and installing software updates in power limited environments are described herein. In one particular embodiment, an intelligent network-connected thermostat for controlling the operation of an HVAC system in a smart home environment is disclosed. Thermostat includes a communications component for communicating with at least one server that is located remotely from the thermostat, HVAC control circuitry operable to actuate one or more elements of the HVAC system, a storage element for storing computer software operable to control one or more functions of the thermostat, and a processor. The processor is operable to perform a variety of operations. For example, the processor may be operable to receive a criticality indicator indicating whether a software update to the computer software stored in the storage element is critical or not, download the software update from a software update server via the communications component, determine whether the software update was downloaded during an initial installation of the thermostat in a physical structure, determine, based on the criticality indicator, whether the software update is critical, and delay installation of the software update when it is determined that the software update is not critical and the software update was downloaded during the initial installation of the thermostat in the physical structure.

In another particular embodiment, a thermostat includes a communications component for communicating with at least one server that is located remotely from the thermostat, HVAC control circuitry operable to actuate one or more elements of the HVAC system, a storage element for storing computer software operable to control one or more functions of the thermostat, and a processor operable to perform a variety of operations. For example, the processor may be operable to download a software update to the computer software stored in the storage element from a software update server via the communications component, determine whether the HVAC control circuitry has actuated one or more elements of the HVAC system to be in an active state, and when it is determined that one or more elements of the HVAC system are in an active state, delay installation of the software update until the one or more elements of the HVAC system are in an inactive state.

In yet another particular embodiment, a thermostat includes a communications component for communicating with at least one server that is located remotely from the thermostat, HVAC control circuitry operable to actuate one or more elements of the HVAC system, a storage element for storing computer software operable to control one or more functions of the thermostat, and a processor operable to perform a variety of operations. For example, the processor may be operable to download a software update to the computer software stored in the storage element from a software update server via the communications component, disable control of one or more elements of the HVAC system, install the software update, and enable control of one or more elements of the HVAC system after installing the software update.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Figure 1A:
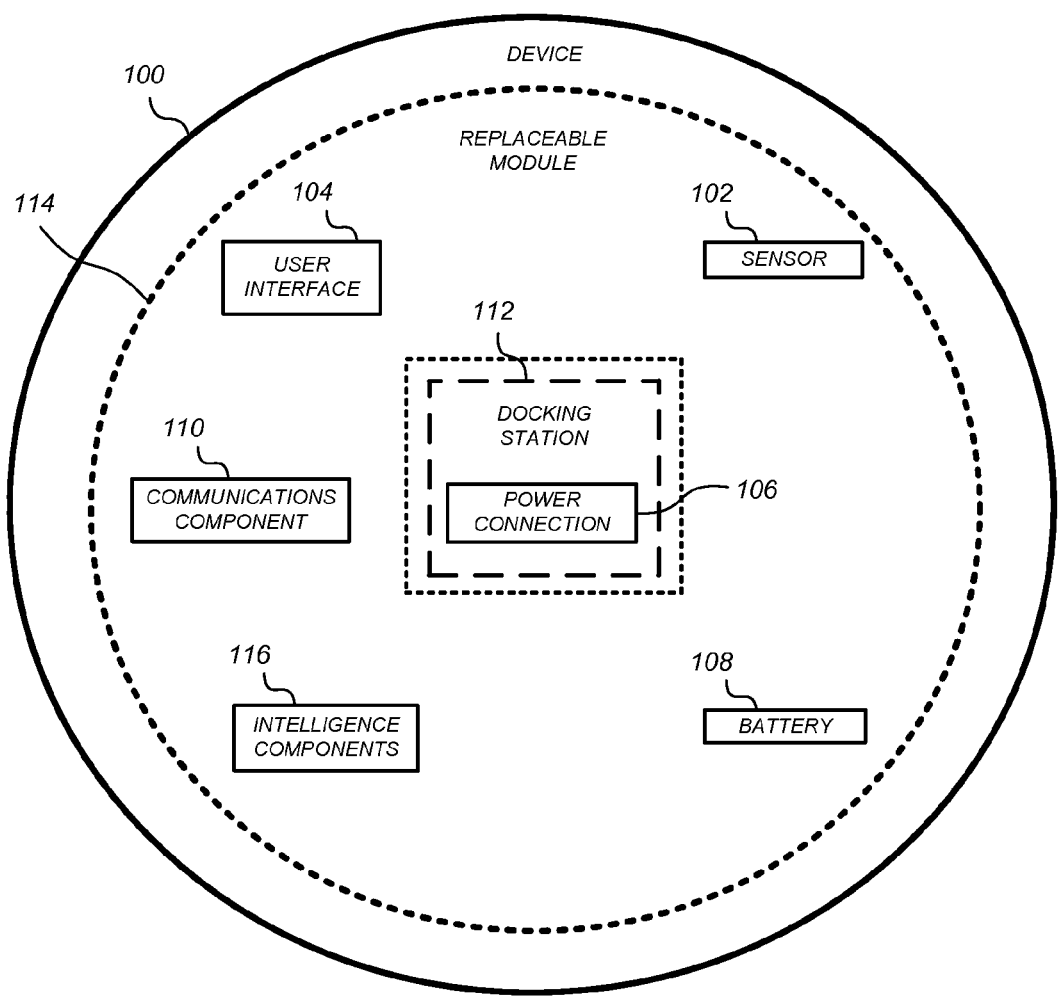
FIG. 1A illustrates an example of general device components which can be included in an intelligent, network-connected device.

As described further herein, one or more intelligent, multi-sensing, network-connected devices can be used to promote user comfort, convenience, safety and/or cost savings. FIG. 1A illustrates an example of general device components which can be included in an intelligent, network-connected device 100 (i.e., "device"). Each of one, more or all devices 100 within a system of devices can include one or more sensors 102, a user-interface component 104, a power supply (e.g., including a power connection 106 and/or battery 108), a communications component 110, a modularity unit (e.g., including a docking station 112 and replaceable module 114) and intelligence components 116. Particular sensors 102, user-interface components 104, power-supply configurations, communications components 110, modularity units and/or intelligence components 116 can be the same or similar across devices 100 or can vary depending on device type or model.

By way of example and not by way of limitation, one or more sensors 102 in a device 100 may be able to, e.g., detect acceleration, temperature, humidity, water, supplied power, proximity, external motion, device motion, sound signals, ultrasound signals, light signals, fire, smoke, carbon monoxide, global-positioning-satellite (GPS) signals, or radio-frequency (RF) or other electromagnetic signals or fields. Thus, for example, sensors 102 can include temperature sensor(s), humidity sensor(s), hazard-related sensor(s) or other environmental sensor(s), accelerometer(s), microphone(s), optical sensors up to and including camera(s) (e.g., charged-coupled-device or video cameras), active or passive radiation sensors, GPS receiver(s) or radio-frequency identification detector(s). While FIG. 1 illustrates an embodiment with a single sensor, many embodiments will include multiple sensors. In some instances, device 100 includes one or more primary sensors and one or more secondary sensors. The primary sensor(s) can sense data central to the core operation of the device (e.g., sensing a temperature in a thermostat or sensing smoke in a smoke detector). The secondary sensor(s) can sense other types of data (e.g., motion, light or sound), which can be used for energy-efficiency objectives or smart-operation objectives. In some instances, an average user may even be unaware of an existence of a secondary sensor.

One or more user-interface components 104 in device 100 may be configured to present information to a user via a visual display (e.g., a thin-film-transistor display or organic light-emitting-diode display) and/or an audio speaker. User-interface component 104 can also include one or more user-input components to receive information from a user, such as a touchscreen, buttons, scroll component (e.g., a movable or virtual ring component), microphone or camera (e.g., to detect gestures). In one embodiment, user-input component 104 includes a click-and-rotate annular ring component, wherein a user can interact with the component by rotating the ring (e.g., to adjust a setting) and/or by clicking the ring inwards (e.g., to select an adjusted setting or to select an option). In another embodiment, user-input component 104 includes a camera, such that gestures can be detected (e.g., to indicate that a power or alarm state of a device is to be changed).

A power-supply component in device 100 may include a power connection 106 and/or local battery 108. For example, power connection 106 can connect device 100 to a power source such as a line voltage source. In some instances, connection 106 to an AC power source can be used to repeatedly charge a (e.g., rechargeable) local battery 108, such that battery 108 can later be used to supply power if needed in the event of an AC power disconnection or other power deficiency scenario.

A communications component 110 in device 100 can include a component that enables device 100 to communicate with a central server or a remote device, such as another device described herein or a portable user device. Communications component 110 can allow device 100 to communicate via, e.g., Wi-Fi, ZigBee, 3G/4G wireless, CAT6 wired Ethernet, HomePlug or other powerline communications method, telephone, or optical fiber, by way of non-limiting examples. Communications component 110 can include a wireless card, an Ethernet plug, or another transceiver connection. In some embodiments, the communications component 110 facilitates communication with a central server to synchronize information between device 100, the central server, and in some cases additional devices. Techniques for synchronization data between such devices as further described in U.S. patent application Ser. No. 13/624,892, filed Sep. 22, 2012, the contents of which are incorporated by reference in their entirety for all purposes. In some embodiments, the communications component 110 also or alternatively facilitates communication with a software update server to acquire software updates for the device 100 as further described herein.

A modularity unit in device 100 can include a static physical connection, and a replaceable module 114. Thus, the modularity unit can provide the capability to upgrade replaceable module 114 without completely reinstalling device 100 (e.g., to preserve wiring). The static physical connection can include a docking station 112 (which may also be termed an interface box) that can attach to a building structure. For example, docking station 112 could be mounted to a wall via screws or stuck onto a ceiling via adhesive. Docking station 112 can, in some instances, extend through part of the building structure. For example, docking station 112 can connect to wiring (e.g., to 120V line voltage wires) behind the wall via a hole made through a wall's sheetrock. Docking station 112 can include circuitry such as power-connection circuitry 106 and/or AC-to-DC powering circuitry and can prevent the user from being exposed to high-voltage wires. Docking station 112 may also or alternatively include control circuitry for actuating (i.e., turning on and off) elements of an HVAC system, such as a heating unit (for heating the building structure), an air-condition unit (for cooling the building structure), and/or a ventilation unit (for circulating air throughout the building structure). In some instances, docking stations 112 are specific to a type or model of device, such that, e.g., a thermostat device includes a different docking station than a smoke detector device. In some instances, docking stations 112 can be shared across multiple types and/or models of devices 100.

Replaceable module 114 of the modularity unit can include some or all sensors 102, processors, user-interface components 104, batteries 108, communications components 110, intelligence components 116 and so forth of the device. Replaceable module 114 can be configured to attach to (e.g., plug into or connect to) docking station 112. In some instances, a set of replaceable modules 114 are produced with the capabilities, hardware and/or software, varying across the replaceable modules 114. Users can therefore easily upgrade or replace their replaceable module 114 without having to replace all device components or to completely reinstall device 100. For example, a user can begin with an inexpensive device including a first replaceable module with limited intelligence and software capabilities. The user can then easily upgrade the device to include a more capable replaceable module. As another example, if a user has a Model #1 device in their basement, a Model #2 device in their living room, and upgrades their living-room device to include a Model #3 replaceable module, the user can move the Model #2 replaceable module into the basement to connect to the existing docking station. The Model #2 replaceable module may then, e.g., begin an initiation process in order to identify its new location (e.g., by requesting information from a user via a user interface).

Intelligence components 116 of the device can support one or more of a variety of different device functionalities. Intelligence components 116 generally include one or more processors configured and programmed to carry out and/or cause to be carried out one or more of the advantageous functionalities described herein. The intelligence components 116 can be implemented in the form of general-purpose processors carrying out computer code stored in local memory (e.g., flash memory, hard drive, random access memory), special-purpose processors or application-specific integrated circuits, combinations thereof, and/or using other types of hardware/firmware/software processing platforms. The intelligence components 116 can furthermore be implemented as localized versions or counterparts of algorithms carried out or governed remotely by central servers or cloud-based systems, such as by virtue of running a Java virtual machine (JVM) that executes instructions provided from a cloud server using Asynchronous Javascript and XML (AJAX) or similar protocols. By way of example, intelligence components 116 can be intelligence components 116 configured to detect when a location (e.g., a house or room) is occupied, up to and including whether it is occupied by a specific person or is occupied by a specific number of people (e.g., relative to one or more thresholds). Such detection can occur, e.g., by analyzing microphone signals, detecting user movements (e.g., in front of a device), detecting openings and closings of doors or garage doors, detecting wireless signals, detecting an IP address of a received signal, or detecting operation of one or more devices within a time window. Intelligence components 116 may include image-recognition technology to identify particular occupants or objects.

In some instances, intelligence components 116 can be configured to predict desirable settings and/or to implement those settings. For example, based on the presence detection, intelligence components 116 can adjust device settings to, e.g., conserve power when nobody is home or in a particular room or to accord with user preferences (e.g., general at-home preferences or user-specific preferences). As another example, based on the detection of a particular person, animal or object (e.g., a child, pet or lost object), intelligence components 116 can initiate an audio or visual indicator of where the person, animal or object is or can initiate an alarm or security feature if an unrecognized person is detected under certain conditions (e.g., at night or when lights are out). As yet another example, intelligence components 116 can detect hourly, weekly or even seasonal trends in user settings and adjust settings accordingly. For example, intelligence components 116 can detect that a particular device is turned on every week day at 6:30 am, or that a device setting is gradually adjusted from a high setting to lower settings over the last three hours. Intelligence components 116 can then predict that the device is to be turned on every week day at 6:30 am or that the setting should continue to gradually lower its setting over a longer time period.

In some instances, devices can interact with each other such that events detected by a first device influences actions of a second device. For example, a first device can detect that a user has pulled into a garage (e.g., by detecting motion in the garage, detecting a change in light in the garage or detecting opening of the garage door). The first device can transmit this information to a second device, such that the second device can, e.g., adjust a home temperature setting, a light setting, a music setting, and/or a security-alarm setting. As another example, a first device can detect a user approaching a front door (e.g., by detecting motion or sudden light-pattern changes). The first device can, e.g., cause a general audio or visual signal to be presented (e.g., such as sounding of a doorbell) or cause a location-specific audio or visual signal to be presented (e.g., to announce the visitor's presence within a room that a user is occupying).

Figure 1B:
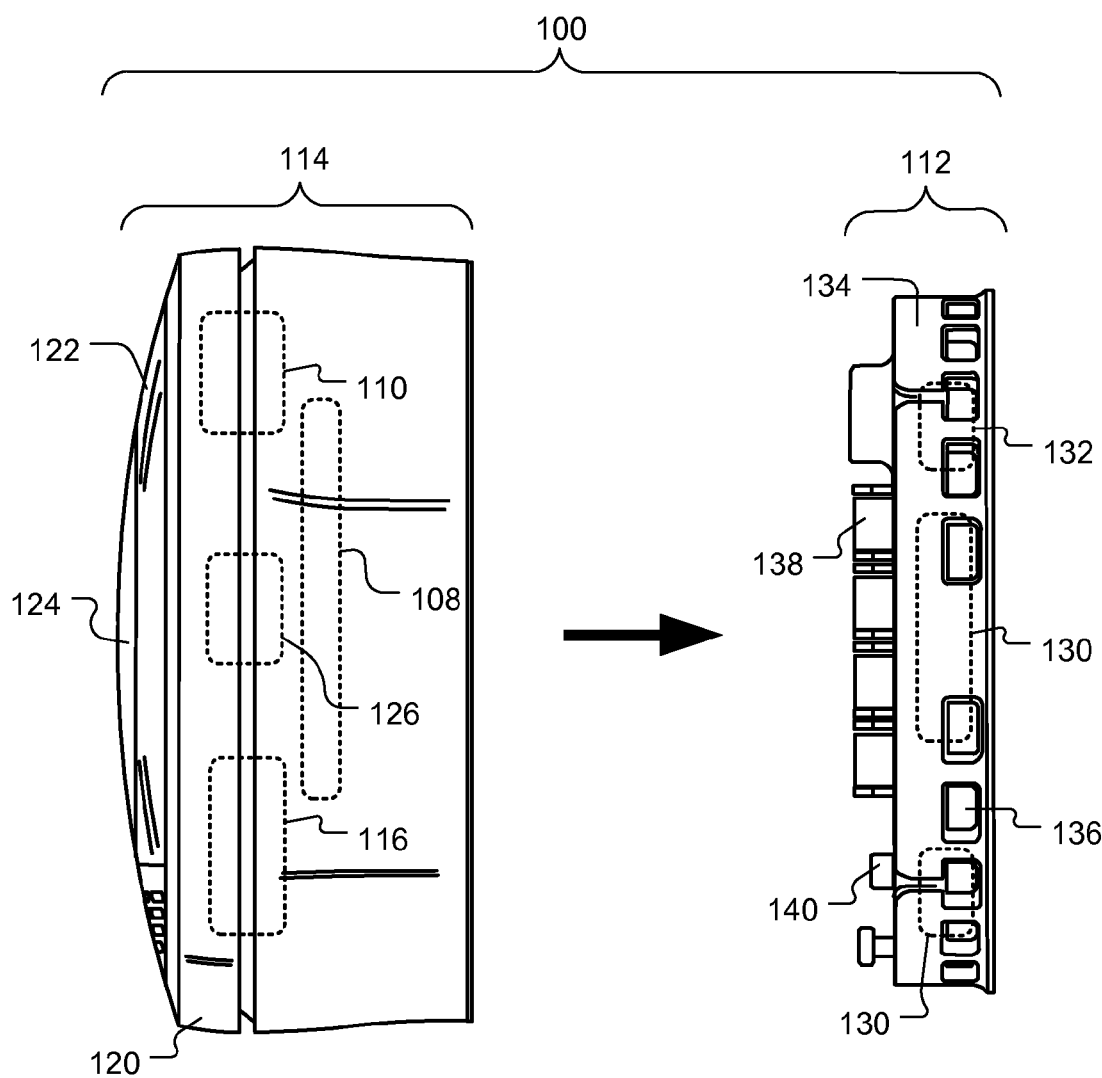
FIG. 1B illustrates an intelligent, network-connected device having a replaceable module and a docking station according to some embodiments.

FIG. 1B illustrates an intelligent, network-connected device 100 having a replaceable module 114 (e.g., a head unit) and a docking station 112 (e.g., a back plate) for ease of installation, configuration, and upgrading according to some embodiments. As is described hereinabove, device 100 may be wall mounted, have a circular shape, and have an outer rotatable ring 120 (that may be, e.g., part of user interface 104) for receiving user input. Outer rotatable ring 120 allows the user to make adjustments, such as selecting a new target temperature. For example, by rotating outer ring 120 clockwise, a target setpoint temperature can be increased, and by rotating the outer ring 120 counter-clockwise, the target setpoint temperature can be decreased.

Device 100 has a cover 122 that includes a display 124 (that may be, e.g., part of user interface 104). Head unit 114 slides onto back plate 112. Display 124 may display a variety of information depending on, e.g., a current operational state of the device 100, direct user interaction with the device via ring 120, sensed presence of the user via, e.g., a proximity sensor 102 (such as a passive infrared motion sensor), remote user interaction with the device via a remote access device, etc. For example, display 124 may display central numerals that are representative of a current setpoint temperature.

According to some embodiments the connection of the head unit 114 to back plate 112 can be accomplished using magnets, bayonet, latches and catches, tabs or ribs with matching indentations, or simply friction on mating portions of the head unit 114 and back plate 112. According to some embodiments, the head unit 114 includes battery 108, communications component 110, intelligence components 116, and a display driver 126 (that may be, e.g., part of user interface 104). Battery 108 may be recharged using recharging circuitry (that may be, e.g., part of intelligence components 116 and/or may be included in the back plate 112) that uses power from the back plate 112 that is either obtained via power harvesting (also referred to as power stealing and/or power sharing) from the HVAC system control circuit(s) or from a common wire, if available, as described in further detail in commonly assigned co-pending U.S. patent application Ser. Nos. 13/034,674 and 13/034,678, both filed Feb. 24, 2011, and U.S. patent application Ser. No. 13/267,871, filed Oct. 6, 2011, all of which are incorporated by reference herein in their entirety for all purposes. According to some embodiments, battery 108 is a rechargeable single cell lithium-ion, or a lithium-polymer battery.

Back plate 112 includes electronics 130 and a temperature sensor 132 (that may be, e.g., one of sensors 102) in housing 134, which are ventilated via vents 136. Temperature sensor 132 allows the back plate 112 to operate as a fully functional thermostat even when not connected to the headunit 114. Wire connectors 138 are provided to allow for connection to HVAC system wires, such as connection to wires for actuating components of the HVAC system, wires for receiving power from the HVAC system, etc. Connection terminal 140 is a male or female plug connector that provides electrical connections between the head unit 114 and back plate 112. Various arrangements for connecting to and controlling an HVAC system are further described in U.S. patent application Ser. Nos. 13/034,674 and 13/034,678, supra.

In some embodiments, the back plate electronics 130 includes an MCU processor, and driver circuitry for opening and closing the HVAC control circuits, thereby turning on and turning off the one or more HVAC functions such as heating and cooling. The electronics 130 also includes flash memory which is used to store a series of programmed settings that take effect at different times of the day, such that programmed setpoint (i.e., desired temperature) changes can be carried out even when the headunit 114 is not attached to the back plate 112. According to some embodiments, the electronics 130 also includes power harvesting circuitry (that may be in addition or alternatively to that provided in headunit 114) to obtain power from the HVAC control circuit(s) even when an HVAC common power wire is not available.

Device 100 in certain embodiments is an intelligent, network-connected learning thermostat that includes various components such as a head unit, a back plate, a user interface, communications components, intelligent components, etc. However, it will be appreciated by those skilled in the art that devices that perform the various operations described herein could operate equally well with fewer or a greater number of components than are illustrated in FIGS. 1A and 1B. Thus, the depiction of device 100 in FIGS. 1A and 1B should be taken as being illustrative in nature, and not limiting to the scope of the present teachings.

Figure 2:
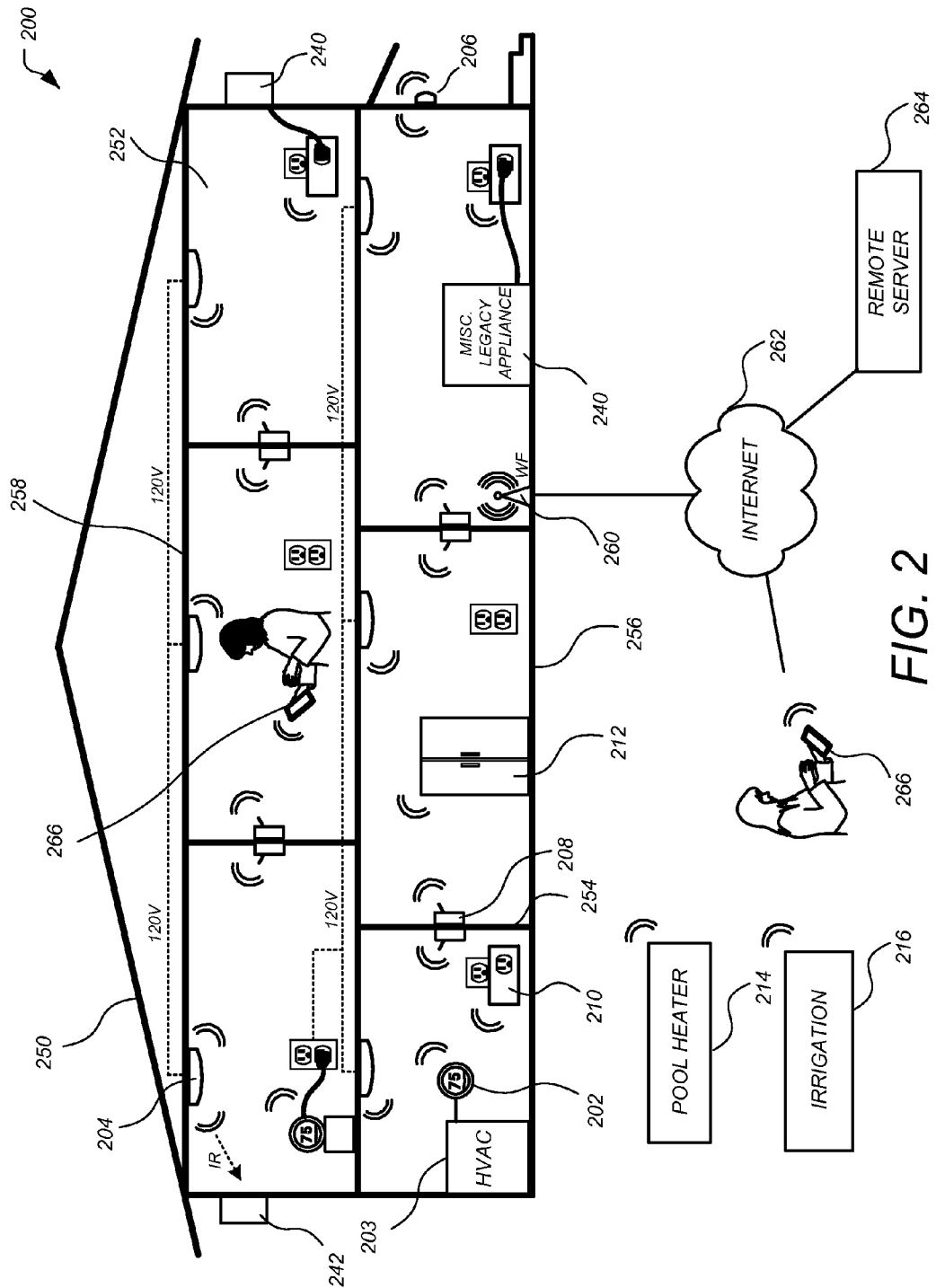
FIG. 2 illustrates an example of a smart home environment within which one or more of the devices, methods, systems, services, and/or computer program products described further herein can be applicable.

FIG. 2 illustrates an example of a smart home environment 200 within which one or more of the devices, methods, systems, services, and/or computer program products described further herein can be applicable. The depicted smart home environment includes a structure 250, which can include, e.g., a house, office building, garage, or mobile home. It will be appreciated that devices can also be integrated into a smart home environment that does not include an entire structure 250, such as an apartment, condominium, or office space. Further, the smart home environment can control and/or be coupled to devices outside of the actual structure 250. Indeed, several devices in the smart home environment need not physically be within the structure 250 at all. For example, a device controlling a pool heater or irrigation system can be located outside of the structure 250.

The depicted structure 250 includes a plurality of rooms 252, separated at least partly from each other via walls 254. The walls 254 can include interior walls or exterior walls. Each room can further include a floor 256 and a ceiling 258. Devices can be mounted on, integrated with and/or supported by a wall 254, floor or ceiling.

The smart home depicted in FIG. 2 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment can include one or more sensors, a user interface, a power supply, a communications component, a modularity unit and intelligent software as described with respect to FIGS. 1A and 1B.

Further, one, more or each of the devices illustrated in FIG. 2 can acquire software updates from a software update server, such as a software update server included in or coupled to remote server 264.

An intelligent, multi-sensing, network-connected thermostat 202 can detect ambient climate characteristics (e.g., temperature and/or humidity) and control a heating, ventilation and air-conditioning (HVAC) system 203. One or more intelligent, network-connected, multi-sensing hazard detection units 204 can detect the presence of a hazardous substance and/or a hazardous condition in the home environment (e.g., smoke, fire, or carbon monoxide). One or more intelligent, multi-sensing, network-connected entryway interface devices 206, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 208 can detect ambient lighting conditions, detect room-occupancy states and control a power and/or dim state of one or more lights. In some instances, light switches 208 can further or alternatively control a power state or speed of a fan, such as a ceiling fan. Each of a plurality of intelligent, multi-sensing, network-connected wall plug interfaces 210 can detect occupancy of a room or enclosure and control supply of power to one or more wall plugs (e.g., such that power is not supplied to the plug if nobody is at home). The smart home may further include a plurality of intelligent, multi-sensing, network-connected appliances 212, such as refrigerators, stoves and/or ovens, televisions, washers, dryers, lights (inside and/or outside the structure 250), stereos, intercom systems, garage-door openers, floor fans, ceiling fans, whole-house fans, wall air conditioners, pool heaters 214, irrigation systems 216, security systems, and so forth. While descriptions of FIG. 2 can identify specific sensors and functionalities associated with specific devices, it will be appreciated that any of a variety of sensors and functionalities (such as those described throughout the specification) can be integrated into the device.

In addition to containing processing and sensing capabilities, each of the devices within the smart home environment 200 can be capable of data communications and information sharing with any other devices within the smart home environment 200, as well as to any devices outside the smart home environment 240 such as the access device 266 and/or remote server 264. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 210 can serve as wireless or wired repeaters, and/or can function as bridges between (i) devices plugged into AC outlets and communicating using Homeplug or other power line protocol, and (ii) devices that are not plugged into AC outlets.

For example, a first device can communicate with a second device via a wireless router 260. A device can further communicate with remote devices via a connection to a network, such as the Internet 262. Through the Internet 262, the device can communicate with a central (i.e., remote) server or a cloud-computing system 264. The remote server or cloud-computing system 264 can be associated with a manufacturer, support entity or service provider associated with the device. In one embodiment, a user may be able to contact customer support using a device itself rather than needing to use other communication means such as a telephone or Internet-connected computer. Further, software updates can be automatically sent from the remote server or cloud-computing system 264 to devices (e.g., when available, when purchased, or at routine intervals).

Devices' network connections can further allow a user to interact with the device even if the user is not proximate to the device. For example, a user can communicate with a device (e.g., thermostat 202) using a computer (e.g., a desktop computer, laptop computer, or tablet) or other portable electronic device (e.g., a smartphone) 266. A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home environment 200 also can include a variety of non-communicating legacy appliances 240, such as old conventional washer/dryers, refrigerators, and the like which can be controlled, albeit coarsely (ON/OFF), by virtue of the wall plug interfaces 210. The smart home can further include a variety of partially communicating legacy appliances 242, such as IR-controlled wall air conditioners or other IR-controlled devices, which can be controlled by IR signals provided by the hazard detection units 204 or the light switches 208.

Smart home 200 in certain embodiments is an environment including a number of client devices and access devices all operable to communicate with one another and perform synchronization via a remote server. However, it will be appreciated by those skilled in the art that such an environment could operate equally well having fewer or a greater number of components than are illustrated in FIG. 2. Thus, the depiction of the smart home environment 200 in FIG. 2 should be taken as being illustrative in nature, and not limiting to the scope of the present teachings.

Figure 3:
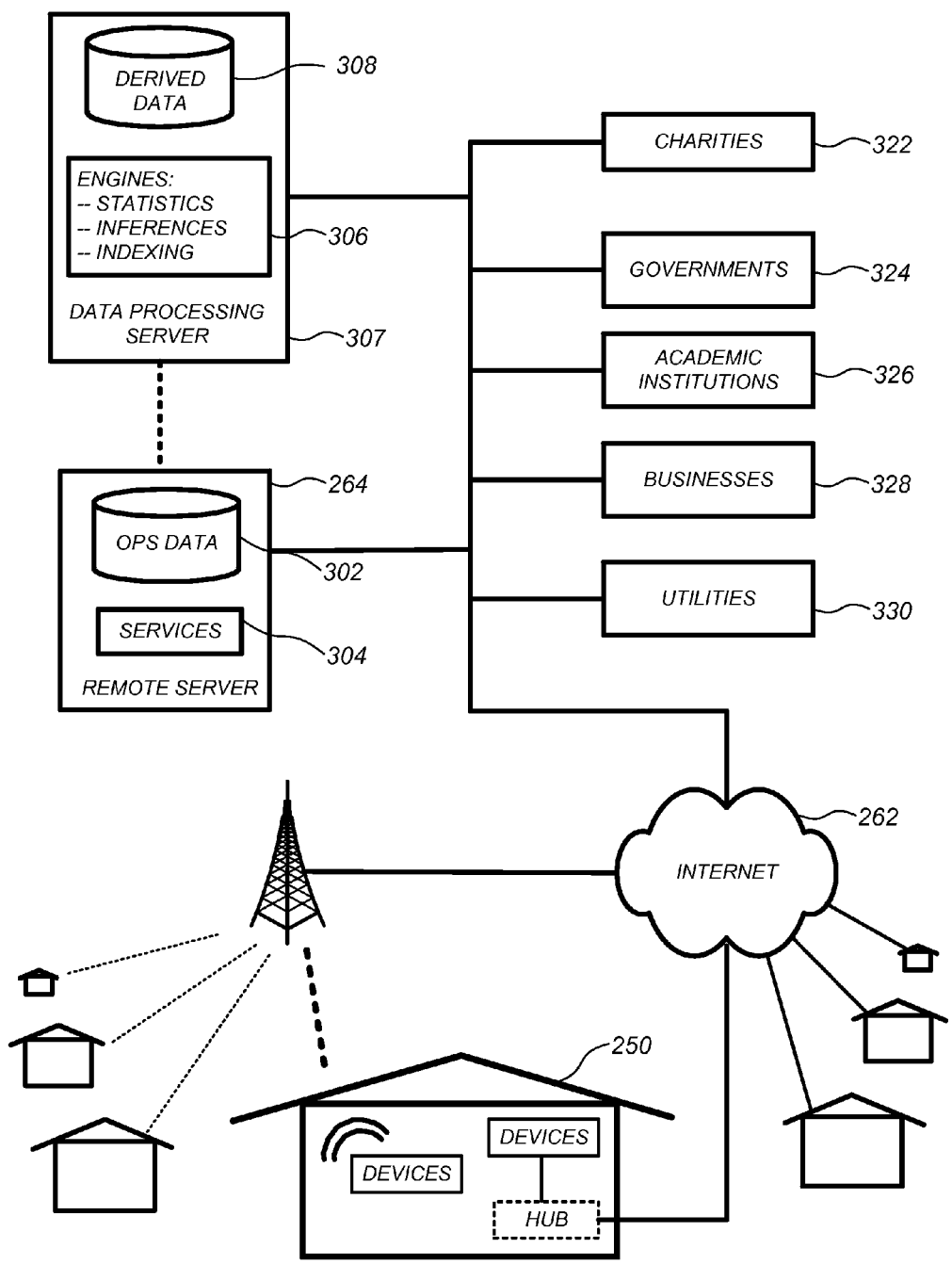
FIG. 3 illustrates a network-level view of an extensible devices and services platform with which a smart home environment can be integrated.

FIG. 3 illustrates a network-level view of an extensible devices and services platform with which the smart home of FIGS. 1 and/or 2 can be integrated. Each of the intelligent, network-connected devices discussed with reference to FIG. 2 can communicate with one or more remote servers or cloud computing systems 264. The communication can be enabled by establishing connection to the Internet 262 either directly (for example, using 3G/4G connectivity to a wireless carrier), though a hubbed network (which can be a scheme ranging from a simple wireless router, for example, up to and including an intelligent, dedicated whole-home control node), or through any combination thereof.

The remote server or cloud-computing system 264 can collect operation data 302 from the smart home devices. For example, the devices can routinely transmit operation data or can transmit operation data in specific instances (e.g., when requesting customer support). The remote server or cloud-computing architecture 264 can further provide one or more services 304. The services 304 can include, e.g., software update, customer support, sensor data collection/logging, remote access, remote or distributed control, or use suggestions (e.g., based on collected operation data 304 to improve performance, reduce utility cost, etc.). Data associated with the services 304 can be stored at the remote server or cloud-computing system 264 and the remote server or cloud-computing system 264 can retrieve and transmit the data at an appropriate time (e.g., at regular intervals, upon receiving request from a user, etc.).

One salient feature of the described extensible devices and services platform, as illustrated in FIG. 3, is a processing engine 306, which can be concentrated at a single data processing server 307 (which may be included in or separate from remote server 264) or distributed among several different computing entities without limitation. Processing engine 306 can include engines configured to receive data from a set of devices (e.g., via the Internet or a hubbed network), to index the data, to analyze the data and/or to generate statistics based on the analysis or as part of the analysis. The analyzed data can be stored as derived data 308. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 262. In this manner, processing engine 306 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, the processing engine 306 can generate statistics about device usage across a population of devices and send the statistics to device users, service providers or other entities (e.g., that have requested or may have provided monetary compensation for the statistics). As specific illustrations, statistics can be transmitted to charities 322, governmental entities 324 (e.g., the Food and Drug Administration or the Environmental Protection Agency), academic institutions 326 (e.g., university researchers), businesses 328 (e.g., providing device warranties or service to related equipment), or utility companies 330. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 4:
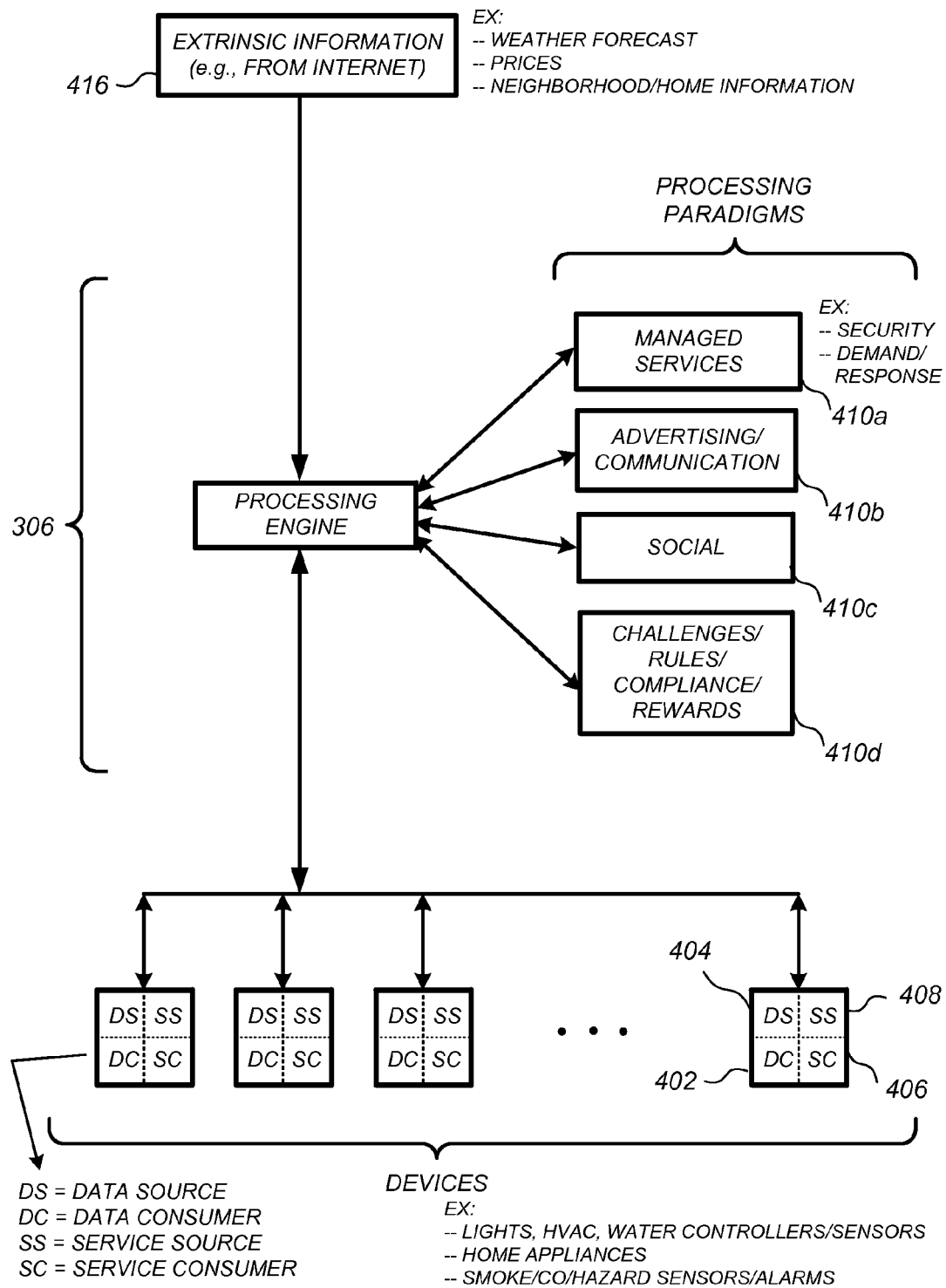
FIG. 4 illustrates an abstracted functional view of the extensible devices and services platform of FIG. 3.

FIG. 4 illustrates an abstracted functional view of the extensible devices and services platform of FIG. 3, with particular reference to the processing engine 306 as well as the devices of the smart home. Even though the devices situated in the smart home will have an endless variety of different individual capabilities and limitations, they can all be thought of as sharing common characteristics in that each of them is a data consumer 402 (DC), a data source 404 (DS), a services consumer 406 (SC), and a services source 408 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 4 shows processing engine 306 as including a number of paradigms 410. Processing engine 306 can include a managed services paradigm 410a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 306 can further include an advertising/communication paradigm 410b that estimates characteristics (e.g., demographic information), desires and/or products of interest of a user based on device usage. Services, promotions, products or upgrades can then be offered or automatically provided to the user. Processing engine 306 can further include a social paradigm 410c that uses information from a social network, provides information to a social network (for example, based on device usage), and/or processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 306 can include a challenges/rules/compliance/rewards paradigm 410d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine 306 can integrate or otherwise utilize extrinsic information 416 from extrinsic sources to improve the functioning of one or more processing paradigms. Extrinsic information 416 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 306 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 5:
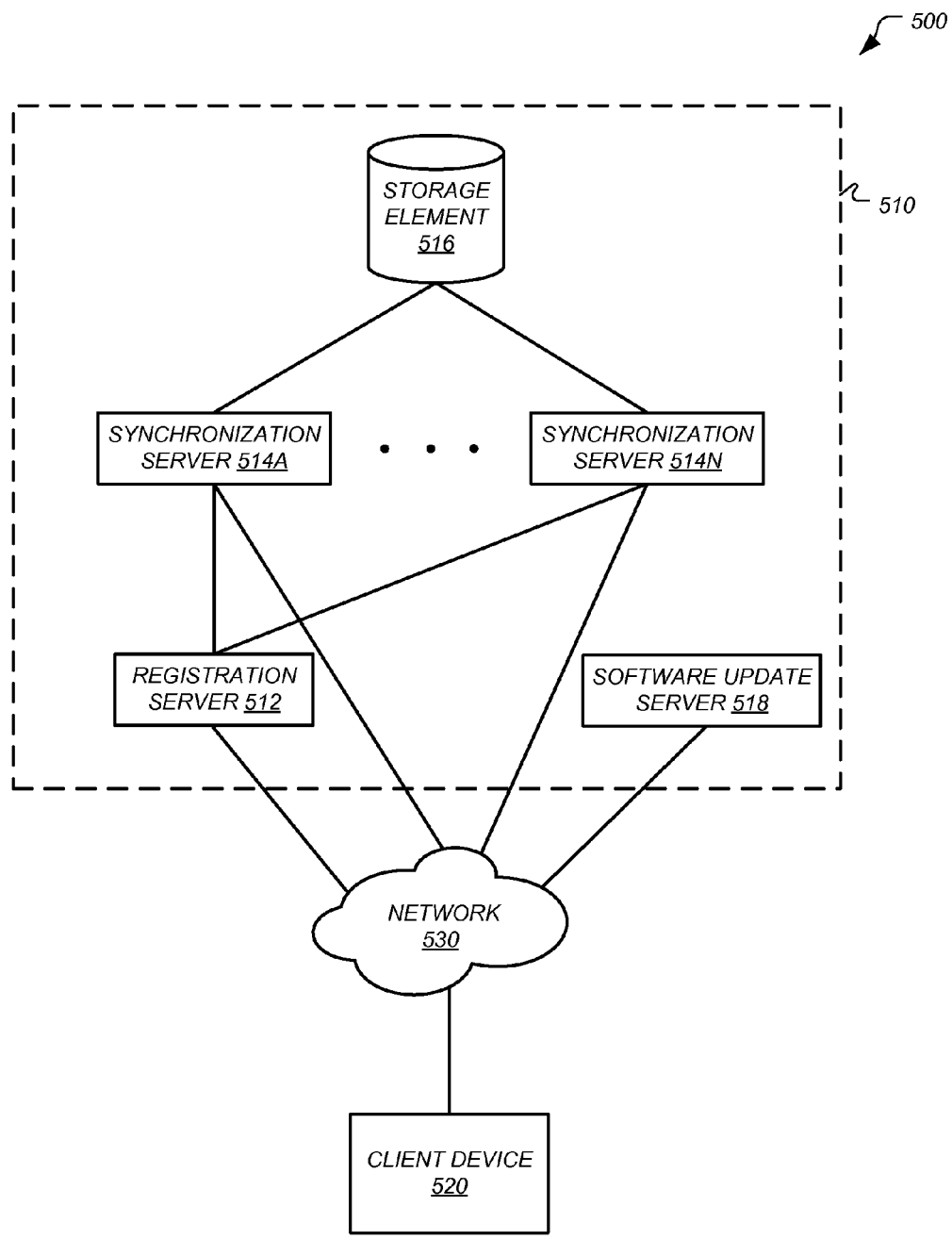
FIG. 5 depicts a system that implements techniques for updating software on a client device according to an embodiment.

FIG. 5 depicts a system 500 that implements techniques for updating software on a client device according to an embodiment. System 500 includes a remote server 510 that is remote from and communicatively coupled to one or more client devices 520 via a network 530.

Client devices 520 include a variety of electronic devices including upgradeable computer software operable to control one or more functions of the device. In some embodiments, client device 520 may take the form of one or more of a variety of electronic devices described herein, such as device 100 (FIGS. 1A and 1B), thermostat 202 (FIG. 2), hazard detection unit 204 (FIG. 2), entryway interface device 206 (FIG. 2), light switch 208 (FIG. 2), wall plug interface 210 (FIG. 2), appliance 212, etc.

Remote server 510 is a single or distributed computing entity in communication with the client devices 520 over network 530. The remote server 510 may be operable to perform any one or more of a variety of operations, such as providing software updates to client devices 520, synchronizing data between elements of the remote server 510 and the client device 520, synchronization data between multiple client devices 520, etc. In some particular embodiments, remote server 520 may take the form of one or more of the remote servers described herein, such as remote server 264 (FIGS. 2 and 3).

The remote server 510 according to certain embodiments includes a registration server 512, one or more synchronization servers 514A through 514N, a storage element 516, and a software update server 518. In some embodiments the software update server 518 may not be included in the remote server 510 but rather may, e.g., be located remotely from the remote server 510.

The registration server 512 may act as a first point of contact for the client devices 520. For example, a client device 520 may have a location identifier (e.g., a URL) of the registration server 512 hardcoded therein, so that on initialization or reconnect, the client device 520 may always contact registration server 512. Among other things, the registration server 512 may identify one of the synchronization servers 514A through 514N which is responsible for synchronizing information at the client device 520 with information at the storage element 516, and provide the identity of the selected synchronization server to the client device 520. The client devices may then subsequently connect to the identified synchronization server which will subsequently synchronize the states of the client device 520 with each other and with the storage element 516.

In synchronizing states, the selected synchronization server may propagate state changes made at the client device 520 to the storage element 516, or similarly may propagate state changes made at the client device 520 to the storage element 516. For example, state changes made at a thermostat 202 may be propagated to the storage element 516. In some embodiments, client devices 520 may include may include monitoring devices (e.g., thermostat 202) that generate data (e.g., data indicative of temperature, humidity, motion, etc.). Client devices 520 may also include access devices (e.g., portable electronic device 266) that provide access to data generated by associated (e.g., paired) monitoring devices and, in some embodiments, control of such monitoring devices. The synchronization server may thus propagate state changes between the monitoring devices and the access devices so that all paired devices (e.g., devices associated with a common user account) eventually have the same state of information. Some specific techniques for synchronizing device states are described U.S. patent application Ser. No. 13/624,892, supra. Further, some specific techniques for pairing devices are described in U.S. patent application Ser. No. 13/275,311, filed Oct. 17, 2011, the contents of which are incorporated by reference in their entirety for all purposes.

In at least one embodiment, the software update server 518 includes packages of computer software for updating the software executing on the client devices 520. The packages of computer software may entirely replace the software executing on the client devices 520 or, in some embodiments, may provide incremental updates to the software executing on the client devices 520. Accordingly, the packages may include operation systems, software applications, etc. The software update server 518 may include packages of computer software for different client devices 520 or, in some embodiments, multiple software update servers 518 may be provided where one or more update server 518 includes computer software packages for one or more types of client devices 520.

Network 530 is any suitable network for enabling communications between various entities, such as between client devices 520 and remote server 510. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Network 530 may utilize any suitable protocol, and communication over the network 530 may be enabled by wired or wireless connections, and combinations thereof.

System 500 in certain embodiments is a distributed computing environment with a remote server 510 including various components communicatively coupled to one or more client devices 520. However, it will be appreciated by those skilled in the art that such a system could operate equally well with fewer or a greater number of components than are illustrated in FIG. 5. Thus, the depiction of system 500 in FIG. 5 should be taken as being illustrative in nature, and not limiting to the scope of the present teachings.

Figure 6:
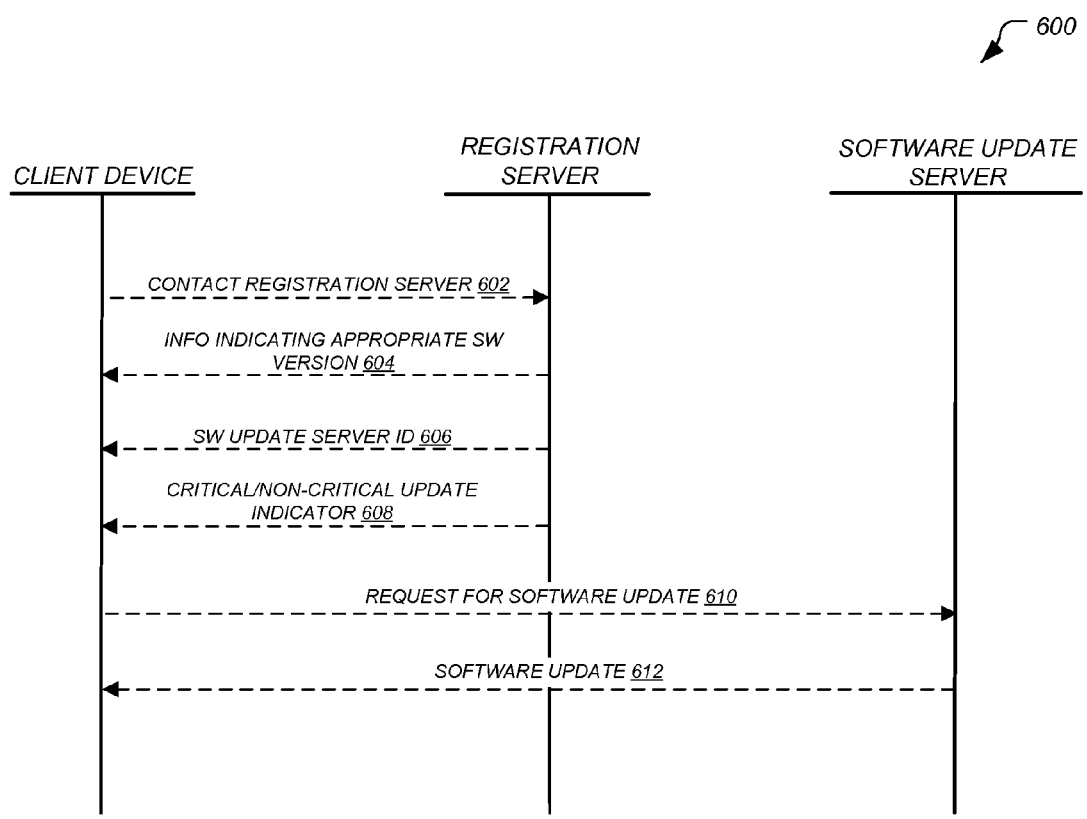
FIG. 6 illustrates a communication sequence of a process for performing software updates according to an embodiment.

FIG. 6 illustrates a communication sequence 600 of a process for performing software updates according to an embodiment. To facilitate understanding, the process 600 is described with reference to FIG. 1 through FIG. 5, although it should be understood that embodiments of the process 600 are not limited to the exemplary systems and apparatus described with reference to FIG. 1 through FIG. 5.

In operation 602, a client device (e.g., device 520) contacts a registration server (e.g., registration server 512). The client device 520 may contact the registration server 512 at a variety of times and in response to a variety of situations. For example, the client device 520 may contact the registration server 512 periodically (e.g., once every 12 hours, once every 24 hours, once every 36 hours, once every time period less than 12 hours, in a range from 12 hours to 36 hours, or more than 36 hours) to, e.g., determine whether the client device 520 should continue to synchronize with a previously identified synchronization server 514 or a newly identified synchronization server 514. For another example, the client device 520 may contact the registration server 512 in the event the client device 520 does not have the credentials (i.e., authorization requirements) to communicate with other elements (e.g., a synchronization server 514) of the remote server 510. For yet another example, the client device 520 may contact the registration server 512 upon initial setup/installation of the client device 520 to, e.g., acquire credentials for communicating with other elements of remote server 510, acquire target locations of other elements of remote server 510, etc. As part of its communications with the registration server 512, the client device 520 may communicate a device identifier that uniquely identifies the client device 520. Details of these and other situations in which a client device contacts a registration server are described in U.S. patent application Ser. No. 13/624,892, supra.

In operation 604, the registration server 512 may provide information indicating an appropriate software version to the client device 520. Information indicating the appropriate software version may indicate a version of software that the registration server desires the client device to execute. The registration server 512 may determine the appropriate software version for the client device based, e.g., on the device identifier communicated from the client device 520. Using the device identifier, the registration server 512 may determine what type of device the client device 520 is (e.g., a thermostat, an entryway interface device, a wall light switch, a wall plug interface, etc.), and based on the type of device determine the appropriate software version.

In operation 606, the registration server 512 may provide a target location (e.g., a URI) of a software update server or system (e.g., software update server 518) where the client device 520 may acquire the software update. The registration server 512 may determine the target location based, e.g., on the appropriate software version.

In operation 608, the registration server 512 provides an indicator (e.g., a flag, a message, etc.) indicating whether the software update is a critical or non-critical update. A critical update may be one which should be installed by the client device 520 regardless of whether the software update is acquired during an initial setup of the client device 520 or during subsequent (i.e., post-setup) operation of the client device 520. Accordingly, a client device 520 should install a critical update even if doing so interrupts the initial setup of the client device 520. In contrast, a client device 520 should install a non-critical update only if doing so does not interrupt the initial setup of the client device 520.

In operation 610, after determining that it should download a software update, the client device 520 sends a request for the software update to the software update server 518. The request is sent to the software update server 518 identified in the communication of operation 606. In response and in operation 612, the client device 520 receives the software update from the software update server 518. The client device 520 may then, at a suitable time, install the downloaded software update.

It should be appreciated that the specific operations illustrated in FIG. 6 provide a particular process for performing software updates according to various embodiments. Other sequences of operations may also be performed according to alternative embodiments. For example, alternative embodiments of the present invention may perform the operations outlined above in a different order. Moreover, the individual operations illustrated in FIG. 6 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 7:
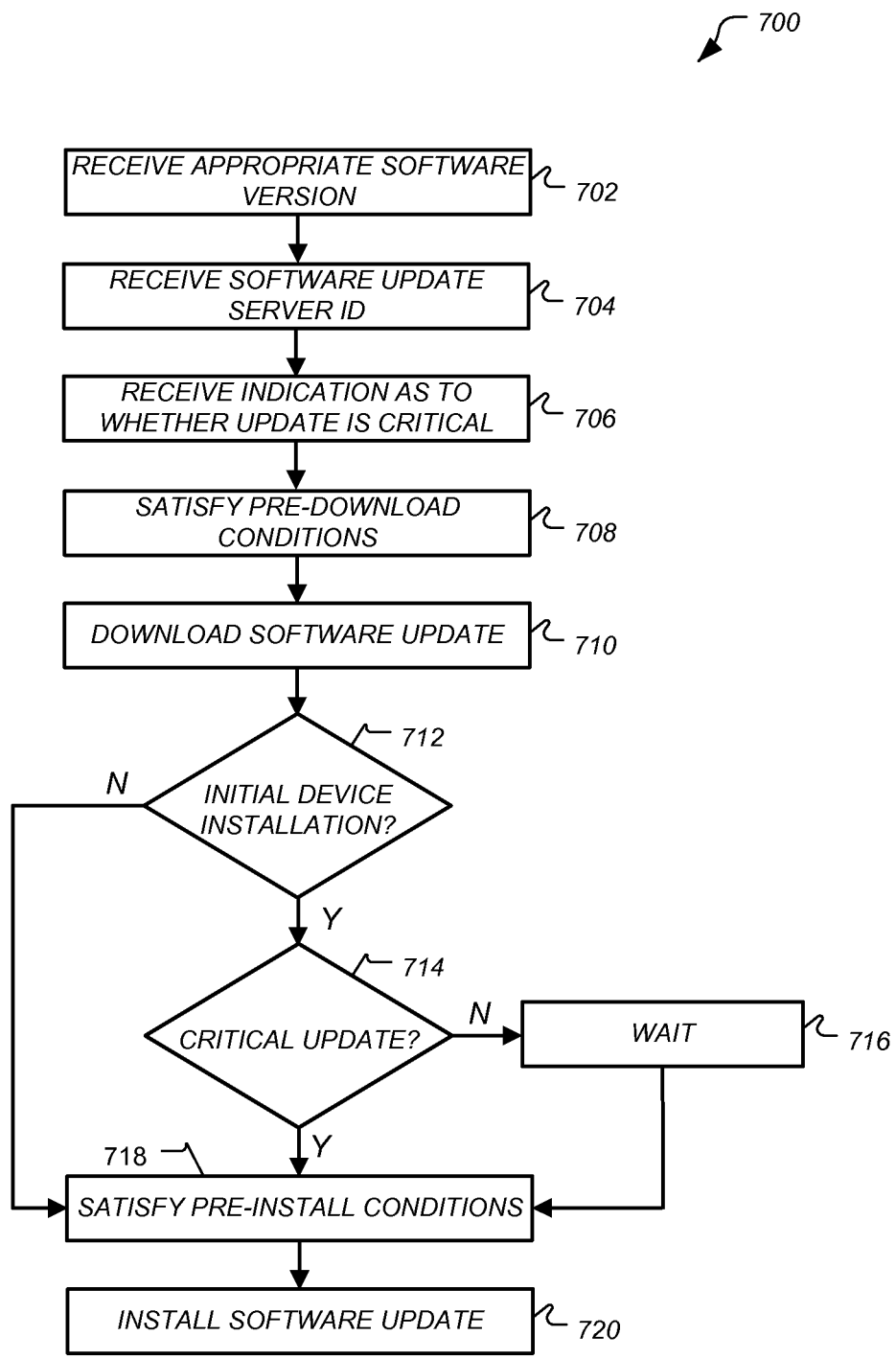
FIG. 7 is a flowchart of a process for a client device to perform software updating according to an embodiment.

FIG. 7 is a flowchart of a process 700 for a client device to perform software updating according to an embodiment. In operation 702, the client device (e.g., client device 520) receives information indicating an appropriate software version, which indicates a version of software that the registration server 512 desires the client device to execute. The client device 520 may receive such information from a registration server (e.g., registration server 512) in response to contacting the registration server.

In operation 704, the client device 520 receives a target location (e.g., a URI) of a software update server or system (e.g., software update server 518) where the client device 520 may acquire the software update. The client device 520 may receive such information from registration server 512 in response to contacting the registration server.

In operation 706, the client device 520 receives a criticality indicator (e.g., a flag, a message, etc.) indicating whether the software update is a critical or non-critical update. The client device 520 may receive the criticality indicator from the registration server 512 in response to contacting the registration server.

In operation 708, the client device 520 ensures that one or more pre-download conditions are satisfied. Pre-download conditions are conditions (e.g., states of the client device 520, elements of the system 500 in which client device 520 exists, and/or of the environment in which the client device 520 is located) that must be satisfied prior to the client device 520 downloading or otherwise acquiring the software update. For example, pre-download conditions may include ensuring that the client device 520 has a battery charge sufficient to fully download the software update. Various pre-download conditions are further described with reference to FIG. 8A. Once the pre-download conditions are satisfied, processing continues to operation 710.

In operation 710, the client device 520 downloads the software update. In one embodiment, the client device 520 may send a request for the software update to the software update server identified in operation 704. In response to sending such a request, the client device 520 may receive the software update from the identified software update server.

After the software update is downloaded, processing continues to operation 712 where the client device 520 determines whether the download occurred as a result of or during a process of installing the device. For example, a user may purchase a thermostat 202 from a retail outlet and, upon acquiring the thermostat 202, install the thermostat 202 into structure 250 either themselves or with the assistance of a professional installer. Installation of the device may include one or more of a variety of aspects, such as hardware installation (e.g., mechanically connecting the device to a wall of the structure 250, electrically coupling the device to other elements associated with structure 250 such as HVAC 203, etc.) and/or software configuration (e.g., configuring the device to connect to a local wireless network, indicating to the device characteristics of an HVAC 203 the device is coupled to, testing the electrical coupling of the device to the HVAC 203, naming the device, pairing the device to a user account, etc.). Some specific techniques for installing a device are described in U.S. patent application Ser. No. 13/038,191 filed Mar. 1, 2011, the contents of which are incorporated by reference in their entirety for all purposes.

If it is determined that the download occurred as a result of or during a process of installing the device, processing continues to operation 714 where the device determines whether the software update is critical or non-critical. To make such a determination the device may, e.g., read the criticality indicator received in operation 706.

If the software update is not critical, then processing continues to operation 716 where the device waits before installing the software update. The device 520 waits a suitable amount of time to reduce the likelihood that installation of the software update will interfere with installation of the device 520. For example, installation of a device may require on average between 10 and 15 minutes. In such cases, the device 520 may wait 20 minutes, 30 minutes, 40 minutes, an amount of time less than 20 minutes, greater than 40 minutes, or in a range from 20 to 40 minutes. For another example, installation of a device may require 30 minutes on average. In such cases, the device 520 may wait 35 minutes, 45 minutes, 55 minutes, an amount of time less than 35 minutes, greater than 55 minutes, or in a range from 35 to 45 minutes. Accordingly, in at least one embodiment, the device may wait a certain amount of time greater than the expected installation time. In some cases, the device may wait on the order of hours, days, or even weeks, rather than minutes.

After waiting in operation 716, after determining that the software update is critical in operation 714, or after determining that the software download did not occur as a result of or during a process of installing the device in operation 712, processing may continue to operation 718. In operation 718 the client device 520 ensures that one or more pre-install conditions are satisfied. Pre-install conditions are conditions (e.g., states of the client device 520, elements of the system 500 in which client device 520 exists, and/or of the environment in which the client device 520 is located) that must be satisfied prior to the client device 520 installing the software update. For example, pre-install conditions may include ensuring that the client device 520 has a battery charge sufficient to install the software update. Various pre-install conditions are further described with reference to FIG. 8B. Once the pre-install conditions are satisfied, processing continues to operation 720, where the client device 520 installs the software update. Various techniques for installing the software update are further described with reference to FIG. 8C.

During the various operations described with reference to FIG. 7, various information (e.g., text, graphics, audio, etc.) may be communicated to the user for a variety of reasons, such as to provide a status of the download/update process, solicit feedback or action by the user, etc. For example, the user may be prompted to perform some task (such as connecting the device to a power source or waiting for the battery level of the device to reach a desired level) while the device satisfies the pre-download conditions and/or the pre-install conditions. For another example, the user may be provided information indicating a status of the download and/or install. In one particular embodiment, the information provided to the user may be determined based on whether the update is critical or not. For example, the status of a download and/or install (e.g., 20% complete, 50% complete, 70% complete, etc.) may be displayed to the user for critical updates, but may be suppressed for non-critical updates. For another example, information concerning satisfying the pre-download conditions (e.g., instructing the user to connect the head unit to the back plate) may be displayed during a critical update, but suppressed during a non-critical update. Accordingly, in a variety of embodiments the determination of whether the update is critical may thus be performed prior to actually downloading the software update and/or prior to satisfying the pre-download conditions.

It should also be recognized that user controllability of the client device may be impacted based on whether the software update is critical or noncritical. In some embodiments, the user may effectively lose control of the client device when critical updates are required. For example, the client device may ignore or otherwise be unresponsive to requests by the user (e.g., requests to change the setpoint, access menu options, etc.). Rather, the client device may instruct the user to perform certain tasks (e.g., charge the battery, wait for install, etc.) so as to ensure that the software updates are downloaded. In contrast, for non-critical updates, the user may retain control of the device and, in some cases, may be entirely unaware of the software update download and/or install since information concerning the download and/or install may be suppressed from the user.

It should be appreciated that the specific operations illustrated in FIG. 7 provide a particular process for performing software updates according to various embodiments. Other sequences of operations may also be performed according to alternative embodiments. For example, alternative embodiments of the present invention may perform the operations outlined above in a different order. Moreover, the individual operations illustrated in FIG. 7 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 8A:
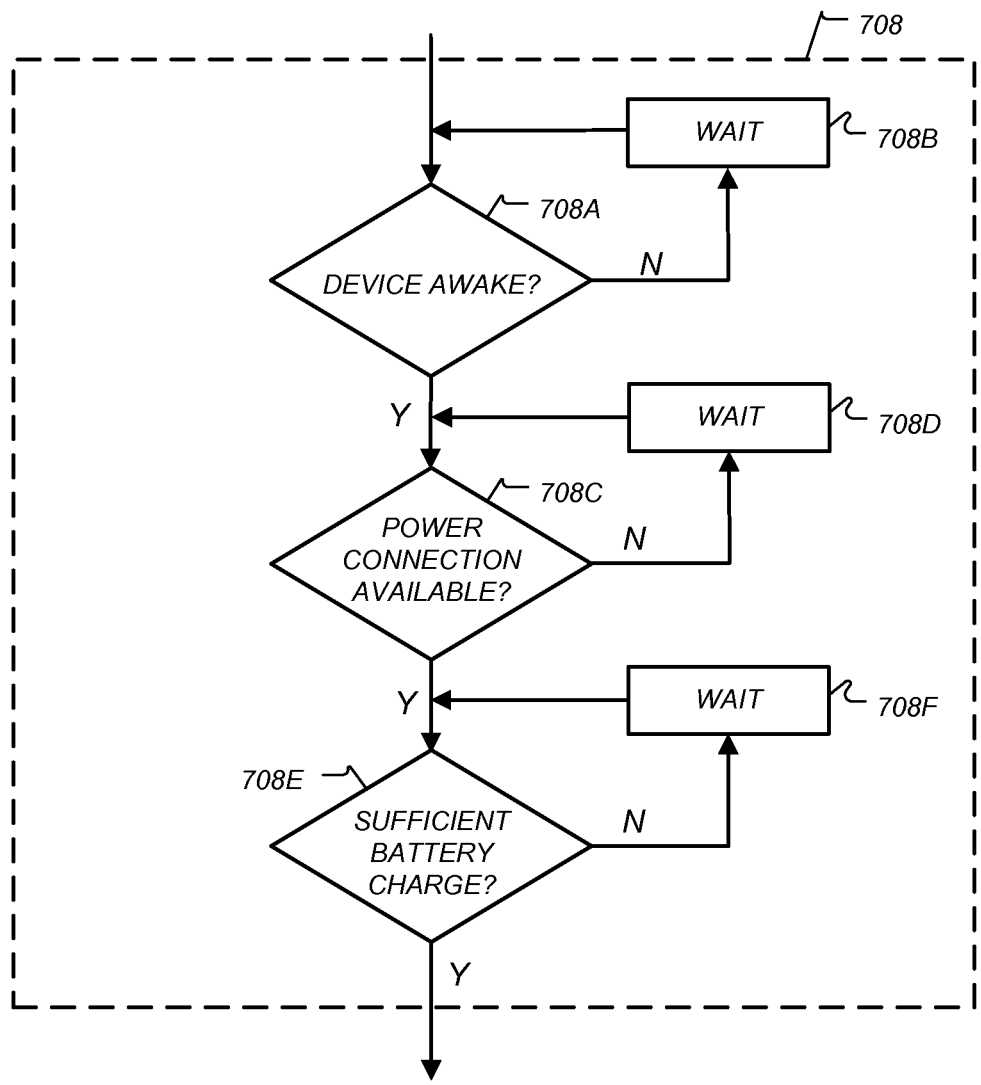
FIG. 8A is a flowchart of a process for a client device to satisfy pre-download conditions according to an embodiment.

FIG. 8A is a flowchart of a process for a client device to satisfy pre-download conditions according to an embodiment. The process may be implemented, for example, as operation 708 described with reference to FIG. 7.

In operation 708A, the client device (e.g., client device 520) determines whether the device is in an 'awake' mode (i.e., state of operation). In some embodiments, the client device 520 may operate in a plurality of different modes of operation, such as an awake mode, a sleep mode, etc. Different modes of operation illustrate different (e.g., scaled) operational characteristics of the client device 520. When operating in an awake mode, the client device may operate with full functionality. For example, the processor(s) of the client device may be active and operating at their maximum level of activity, user display(s) may be active, wireless communications may be enabled and operable to communicate at their maximum capacity, sensor(s) may be active and sampling at their highest sampling rate, etc. In contrast, when in a non-awake mode of operation, such as a sleep mode, the client device may operate at reduced functionality as compared to the awake mode. For example, the processor(s) of the client device may be active (or some even inactive) and operating at a low or medium level of activity, user display(s) may be inactive, wireless communications may be enabled (or even disabled) and operable to communicate at a low or medium capacity, sensor(s) may be active (or even inactive) and sampling at a low or medium sampling rate, etc. Some specific examples of varying modes of operation and their characteristics are described in commonly assigned U.S. patent application Ser. No. 13/267,877, filed Oct. 6, 2011, the entire contents of which are incorporated by reference herein in their entirety for purposes.

It should be recognized that a variety of events may cause the client device to transition from a non-awake mode to an awake mode. For example, the client device may enter into an awake mode if one or more proximity infrared sensors detect an approaching user, a user physically engages the client device (e.g., a user rotates, pushes, or otherwise actuates ring 120), a remote server 510 communicates an awake instruction to the client device 520, etc. Some specific examples of causing client devices to change operating states are described in commonly assigned U.S. patent application Ser. No. 13/267, 877, supra.

If it is determined that the client device is not in an awake mode, then processing may continue to operation 708B where the client device waits until it is operating in an awake mode. Otherwise, processing may continue to operation 708C.

In operation 708C, the client device determines whether a power connection is available. In one embodiment, the client device 520 may determine whether a direct connection to a power source such as a line voltage source is available. For example, connection to an HVAC C-wire via power connection 106. For another example, connection to a power source such as a computing device or AC/DC converter via a USB cable, power cable, or other power transmission medium. In another embodiment, the client device 520 may determine whether an indirect connection to a power source is available (e.g., power stealing from the HVAC system via power connection 106). In yet another embodiment, the client device 520 may determine whether any of the aforementioned direct or indirect connections are available. The connections may be connections from the docking station 112 (e.g., the C-wire and/or power stealing connections) and/or from the replaceable module 114 (e.g., the USB connection). If no power connection is available, then processing may continue to operation 708D where the client device waits for a power connection to become available. Otherwise, processing may continue to operation 708E.

In some embodiments, determining whether a power connection is available may include determining an amount of energy available from a power source (e.g., max voltage, max current, max power, etc.), determining an amount of energy required downloading the software update (e.g., required voltage, current, power, etc. for a period of time), and determining whether the amount of energy available is equal to or greater than that required to download the software update. In one embodiment, a power connection will be deemed available if is determined that the amount of energy available is equal to or greater than that required to download the software, and in another embodiment a power connection will be deemed available if is determined that the amount of energy available is greater than that required to download the software.

As mentioned with reference to FIG. 7, various information may be communicated to the user during the download and/or install process. For example, if it is determined that there is no power connection available, then information requesting such a power connection may be communicated to the user via, e.g., the display 124. In some embodiments, such information may be communicated to the user only for critical updates and suppressed for non-critical updates. In other embodiments, such information may always be communicated to the user. Such information may be communicated when it is desired to cause the user to perform some sort of action (such as by connecting a power source). For example, such information may be communicated during the wait operation 708D.

In operation 708E, the client device determines whether it has sufficient battery charge to download the software update. In one particular embodiment, the client device 520 may determine whether the voltage of battery 108 is equal to or greater than a minimum voltage. If it is, then the client device may determine that it has sufficient battery charge, otherwise, it may determine that its battery charge in insufficient. The minimum voltage may be, e.g., 3.5V, 3.7V, 3.9V, in a range from 3.5V to 3.9V, less than 3.5V, or greater than 3.9V. If it is determined that the battery charge is insufficient, processing may continue to operation 708F where the client device waits until it has acquired a sufficient battery charge. In some embodiments, the client device 520 may charge its battery using power transfer or power stealing techniques as previously described. Otherwise, if it is determined that the battery charge is sufficient, then at this stage the pre-download conditions may be deemed satisfied.

As mentioned, various information may be communicated to the user during the download and/or install process. For example, if it is determined that there is insufficient battery charge, then information indicating that a sufficient battery charge must be acquired prior to downloading the software update may be communicated to the user via, e.g., the display 124. In some embodiments, such information may be communicated to the user only for critical updates and suppressed for non-critical updates. In other embodiments, such information may always be communicated to the user. Such information may be communicated when it is desired to cause the user to perform some sort of action (such as by not interfering with the device so as to allow the device to acquire a sufficient battery charge). For example, such information may be communicated during the wait operation 708F.

In at least one embodiment, operations 708E and 708F may be omitted. For example, when determining whether a power connection is available includes determining whether an amount of energy available is greater than (or equal to) that required to download the software, operations 708E and 708F may be omitted if it is determined that the amount of energy available is greater than (or equal to) that required to download the software since, in such cases, a battery may similarly be omitted or used only for backup or post-download purposes.

Figure 8B:
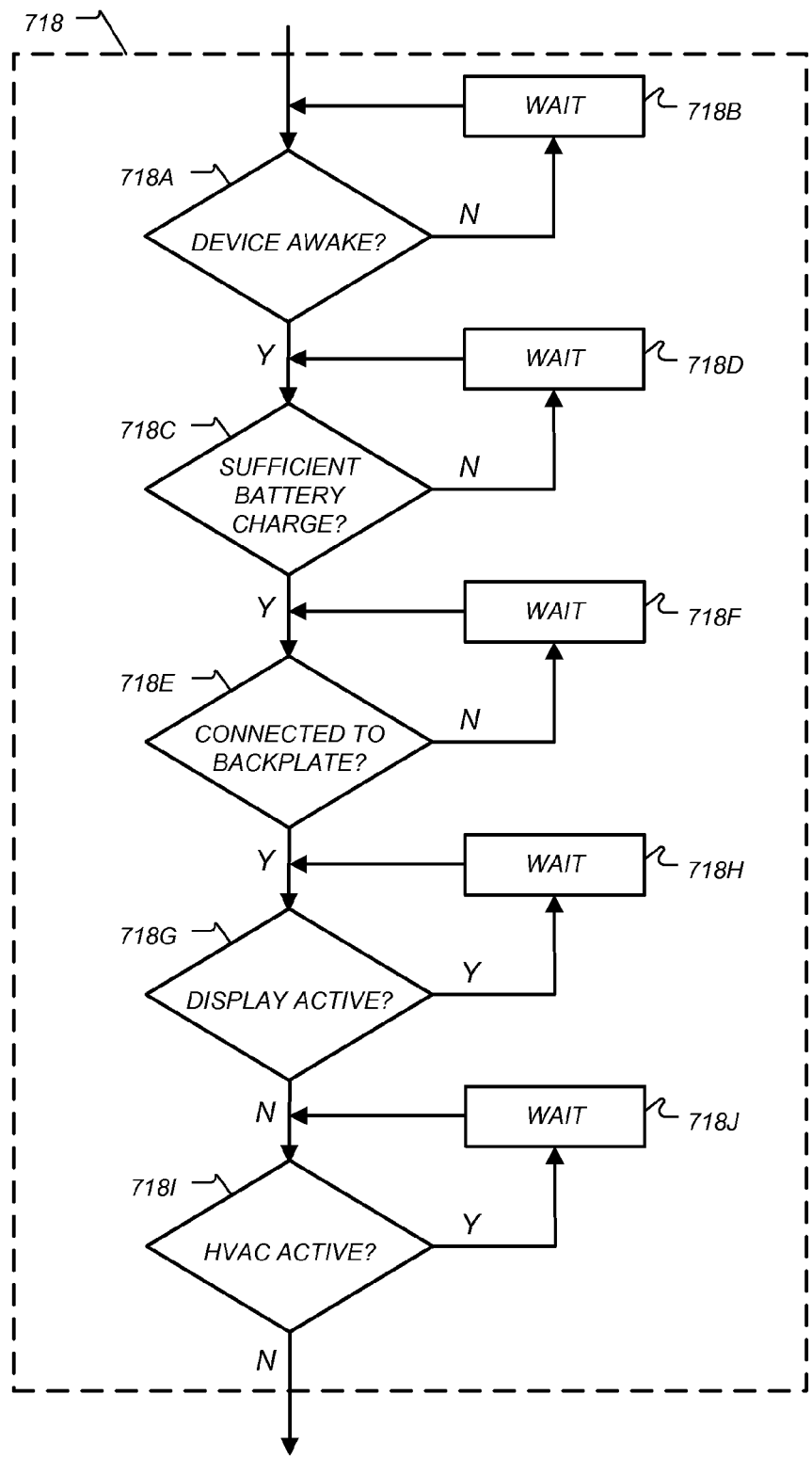
FIG. 8B is a flowchart of a process for a client device to satisfy pre-install conditions according to an embodiment.

FIG. 8B is a flowchart of a process for a client device to satisfy pre-install conditions according to an embodiment. The process may be implemented, for example, as operation 708 described with reference to FIG. 7.

In operation 718A, the client device (e.g., client device 520) determines whether the device is in an 'awake' mode (i.e., state of operation). This may be similar to operation 708A, thus further description is omitted. If it is determined that the client device is not in an awake mode, then processing may continue to operation 718B where the client device waits until it enters into an awake mode of operation. Otherwise, processing may continue to operation 718C.

In operation 718C, the client device determines whether it has sufficient battery charge to install the software update. This operation is similar to operation 708D, except in this case the determination is as to whether the battery charge is sufficient to install rather than download the software update. Thus, further description is omitted. If it is determined that the battery charge is insufficient, then processing may continue to operation 718D where the client device waits until it has obtained a battery charge sufficient to install the software update. Otherwise, processing may continue to operation 718E.

In operation 718E, the client device determines whether it is connected to a back plate. In some embodiments, the client device may be a modular device including a head unit 114 and a back plate 112. In such cases, the device may determine whether the head unit 114 is connected to the back plate 112. Connection to the back plate 112 may increase the likelihood that the battery 108 is charged throughout the installation process, that a power connection 106 is maintained, that a wireless connection to a local area network provided in smart home environment 200 (and thus remote server 510) is maintained, etc. If it is determined that the head unit 114 is disconnected from the back plate 112, then processing may continue to operation 718F where the client device 520 waits until the head unit 114 is connected to the back plate 112. Otherwise, processing may continue to operation 718G.

As mentioned with reference to FIG. 7, various information may be communicated to the user during the download and/or install process. For example, if it is determined that the head unit is not connected to the back plate, then information requesting the user to connect the head unit to the back plate may be communicated to the user via, e.g., the display 124. In some embodiments, such information may be communicated to the user only for critical updates and suppressed for non-critical updates. In other embodiments, such information may always be communicated to the user. Such information may be communicated when it is desired to cause the user to perform some sort of action (such as by connecting a power source). For example, such information may be communicated during the wait operation 718F.

In operation 718G, the client device determines whether its display is active. In some embodiments, the client device 520 may include a display element 124. The display element 124 may be active, in which case it displays information to a user, or inactive, in which case it does not display information to a user. If the display element 124 is active, processing may continue to operation 718H where the client device waits until the display becomes inactive. In this fashion, the software update installation process may be hidden from the user of the device. In contrast, if the display element 124 is inactive, then processing may continue to operation 718I.

In operation 718I, the client device determines whether it is controlling an HVAC system coupled thereto to be active. For example, as previously described electronics 130 may activate heating systems, ventilation systems, air conditions systems, etc. via wire connectors 138. If one or more of these systems are active, then processing may continue to operation 718J where the client device waits until the systems become inactive. In this fashion, installation of the software update does not interrupt operation of the HVAC system. Otherwise, if it is determined that the VHAC system is not active, then the client device may determine that all pre-installation conditions are satisfied.

In some embodiments, the client device may determine that all pre-installation conditions are satisfied even if the HVAC system is active. For example, the client device may check to see how long the HVAC system has been active. If the HVAC system has been continuously active for at least a certain period of time (e.g., 6 hours, 12 hours, 18 hours, 24 hours, an amount of time in the range of 6 hours to 24 hours, less than 6 hours, or greater than 24 hours), then the client device may stop waiting and determine that the HVAC system activity pre-installation condition is satisfied. This may be particularly beneficial in situations where an HVAC system is in continuous use, e.g., in extreme conditions (e.g., extreme heat or extreme cold), where a relatively short HVAC inoperability (e.g., 5 minutes, 10 minutes, 15 minutes, etc.) resulting from installation of the software update may have a minimal impact on overall user comfort or experience.

Figure 8C:
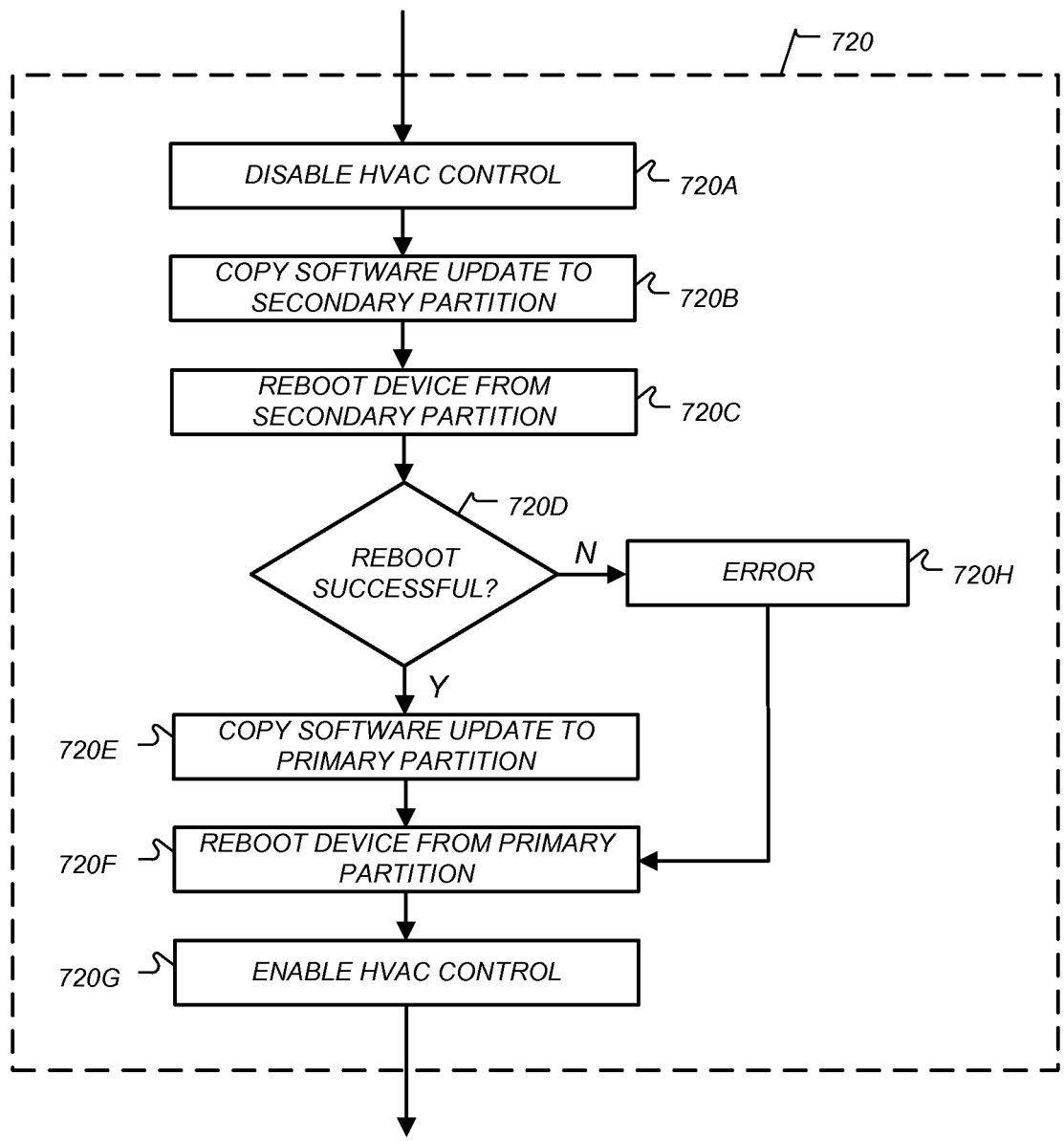
FIG. 8C is a flowchart of a process for a client device to install a software update according to an embodiment.

FIG. 8C is a flowchart of a process for a client device to install a software update according to an embodiment. The process may be implemented, for example, as operation 720 described with reference to FIG. 7.

In operation 720A, the client device disables HVAC control. For example, as previously described electronics 130 may activate heating systems, ventilation systems, air conditions systems, etc. via wire connectors 138. In operation 720A the client device may deactivate or otherwise disable such systems. For example, the electronic circuitry 130 may cause such systems to enter into an OFF state. In some cases, the systems may not be controlled to enter into an OFF state, but rather the electronic circuitry 130 may be temporarily disabled so as to preclude user control of the HVAC system. In such cases, prior to being disabled, the HVAC system could be controlled to enter into a particular state (e.g., an ON state or an OFF state), or may be set to maintain its state of operation existent prior to disabling of electronic circuitry 130. For example, if the HVAC system is in an ON state prior to installing the software update, then the HVAC system may be maintained in the ON state during installation of the software update.

In operation 720B, the software update is copied to a secondary partition. In some embodiments, the client device 520 (e.g., intelligence components 116) may include one or more storage elements having a plurality of storage partitions. An operating system and software for controlling the client device may be installed on a primary partition from which the device operates during typical operation (e.g., during installation and subsequent operation). A secondary partition may be used to facilitate software updating as described herein. That is, while the device is operating via software installed on its primary partition, the device may copy the software update downloaded in, e.g., operation 710, to its secondary partition.

Once the software update has been copied to the secondary partition, in operation 720C the client device may reboot from the secondary partition. In this particular embodiment, the software update includes an operating system (which may have been updated) and may also include additional operational software (which may also or alternatively been updated). In other embodiments, the secondary partition may already have an operating system (and possibly software applications) installed thereon, and the software update may be an incremental update to the operating system and/or software applications.

In operation 720D the client device determines whether the reboot is successful. In being successful, the operating system at the secondary partition is successfully initialized (e.g., successfully reaches steady state). If the reboot is successful, then processing may continue to operation 720E.

In operation 720E, the client device copies the software update to the primary partition. In some embodiments, this may include copying some or all of the contents of the secondary partition to the primary partition. In other embodiments, this may include installing the downloaded software update on the primary partition. Once the software update is installed on the primary partition, processing may continue to operation 720F.

In operation 720F, the client device is rebooted from the primary partition. In this particular case, that is, where the software update was copied to the primary partition, then rebooting from the primary partition will result in rebooting the client device such that the client device is operable with the software update. Processing may then continue to operation 720G, where the client device enables HVAC control (which may be, e.g., the opposite of operation 720A).

Returning to operation 720D, if it is determined that reboot is unsuccessful, then processing may continue to operation 720H. In operation 720H the client device may output an error message to the user indicating that the software update did not successfully install. Processing may then continue to operation 720F, where the client device reboots from the primary partition. Since in this case the software update was not copied to nor installed on the primary partition, the device reboots using the pre-update operating system and/or software application(s).

In accordance with some embodiments, even though HVAC control is may be temporarily disabled during installation of a software update the client device 520 may still be operable to communicate (e.g., receive instructions from, provide information to, etc.) with other elements of system 500. For example, while the client device 520 is copying software updates to different partitions, it may receive (and in some cases, buffer) instructions from other associated client devices (e.g., access devices) via a synchronization server 514. In at least one embodiment, however, all communications between client device 520 and other elements of system 500 may be disabled for one or more periods during installation of the software update. For example, communications may be disabled during rebooting of the device (e.g., in operations 720C and/or 720F). In such cases, the client device is effectively in a 'black out' mode of operation, where the device may not be remotely controlled and, in many cases, may not be locally (i.e., directly) controlled by a user (e.g., by a user attempting to physically manipulate or interact with the device).

It should be appreciated that the specific operations illustrated in FIGS. 8A to 8C provide particular processes for satisfying pre-download conditions, satisfying pre-install conditions, and installing software updates, according to various embodiments. Other sequences of operations may also be performed according to alternative embodiments. For example, alternative embodiments of the present invention may perform the operations outlined above in a different order. Moreover, the individual operations illustrated in FIGS. 8A to 8C may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 9A:
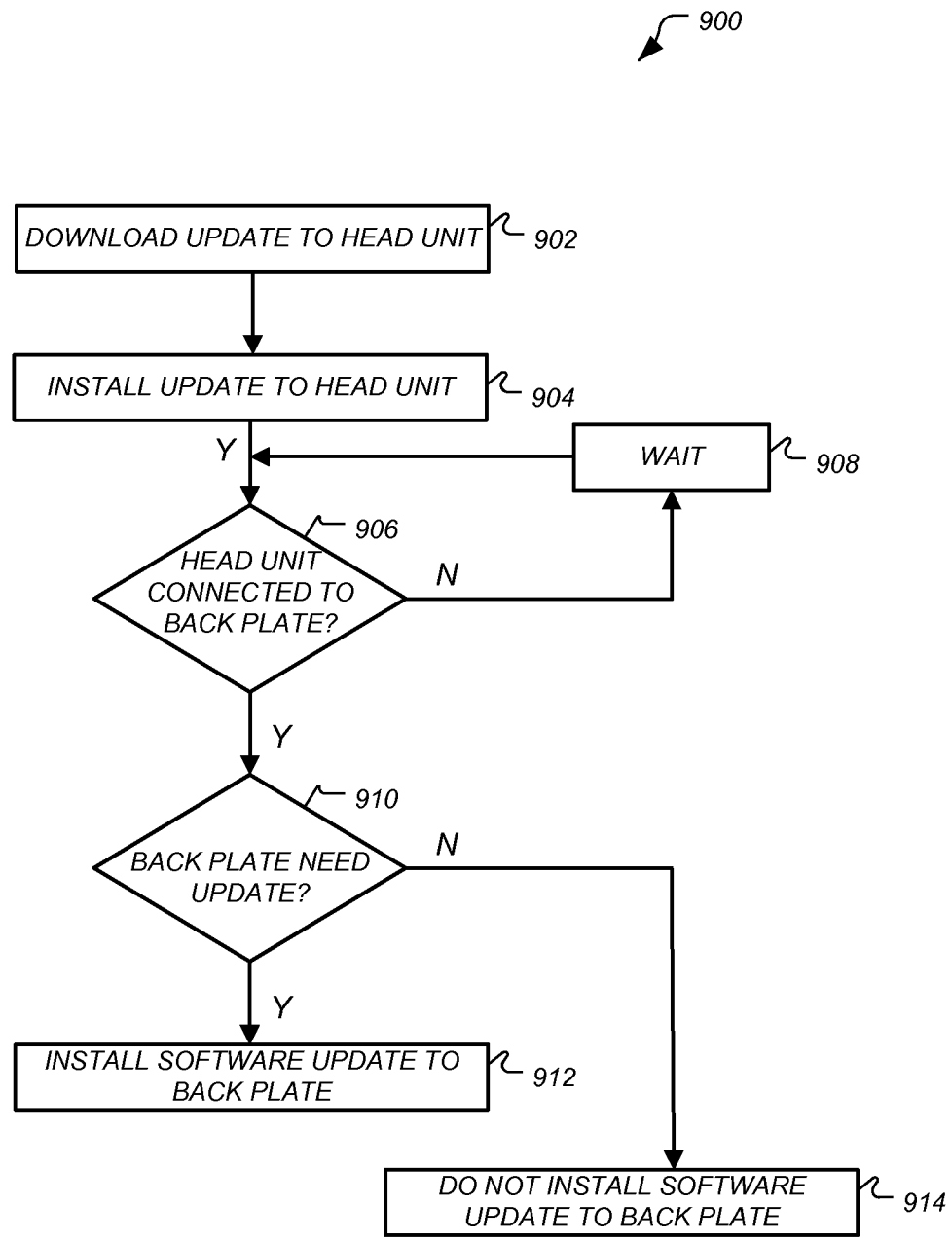
FIG. 9A is a flowchart of a process for a client device to perform software updating of head units and back plates according to an embodiment.

FIG. 9A is a flowchart of a process for a client device to perform software updating of head units and back plates according to an embodiment. In operation 902 a client device (e.g., device 100) downloads a software update to its head unit (e.g., replaceable module 114) and, in operation 904, installs the software update to its head unit. The download and install may be performed in accordance with any of the embodiments described herein. It should be recognized, however, that the software update may include components that update software executing on the head unit as well as components that update different software executing on the back plate. Accordingly, in operation 904, the client device may install the software components that update the software executing or executable on the head unit.

In operation 906, the client device 100 determines whether the head unit 114 is connected to the back plate 112. For example, the head unit software and/or circuitry may determine whether the head unit 114 is coupled to the connection terminal 140. If it is determined that the head unit is not connected to the back plate, then processing may continue to operation 908 where the client device waits until the head unit is connected to the back plate. In some embodiments, during operation 908 the client device may communicate information to the user requesting the user to connect the head unit to the back plate. Once the head unit is connected to the back plate, processing continues to operation 910.

In operation 910, the client device determines whether the back plate needs to be updated. For example, software and/or circuitry executable in the head unit 114 may determine whether the software executing on the back plate needs to be updated in accordance with the downloaded update. If so, then processing continues to operation 912 where the software update is installed to the back plate. Otherwise, processing continues to operation 914 where the software update is not installed to the back plate.

Figure 9B:
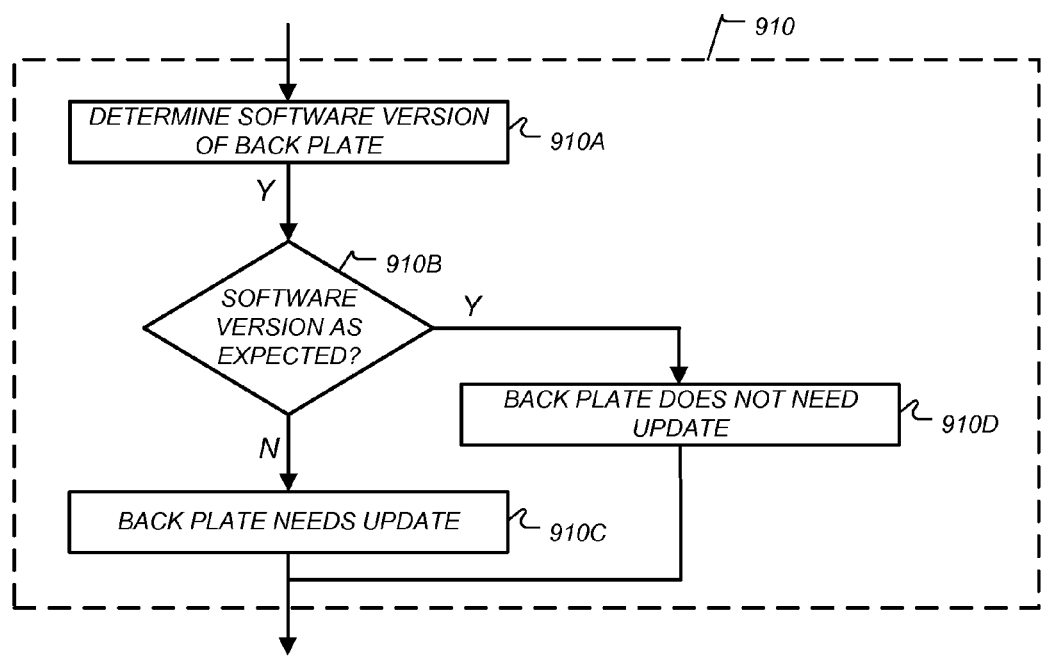
FIG. 9B is a flowchart of a process for a client device to determine whether a back plate needs an update according to an embodiment.

FIG. 9B is a flowchart of a process for a client device to determine whether a back plate needs an update according to an embodiment. In some embodiments, the process may be implemented, for example, as operation 910. In other embodiments, the process may be a stand-alone process. For example, the process may be implemented at various times, such as upon connecting a head unit to a back plate, upon powering on the device, periodically, etc.

In operation 910A, the client device determines the software version of the back plate. The software version may be stored in the back plate, head unit, or other suitable storage location. In one particular embodiment, the head unit may determine the software version of the back plate by reading the stored version information.

In operation 910B, the client device determines whether the software version of the back plate is as expected. In some embodiments, the software update download may include information indicating the version of the back plate software that is the predecessor to the software update. The software running on the back plate may not be the expected version if that software is newer or older than the that indicated in the software update download. If the software version of the back plate is not as expected, then processing continues to operation 910C where it is determined that the back plate needs to be updated. In many cases, this leads to the client device updating the back plate software. Otherwise, processing continues to operation 910D where it is determined that the back plate does not need to be updated.

It should be appreciated that the specific operations illustrated in FIGS. 9A and 9B provide particular processes for performing software updates according to various embodiments. Other sequences of operations may also be performed according to alternative embodiments. For example, alternative embodiments of the present invention may perform the operations outlined above in a different order. For example, the head unit software may not be updated until the head unit is connected to the back plate. Moreover, the individual operations illustrated in FIGS. 9A and 9B may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 10:
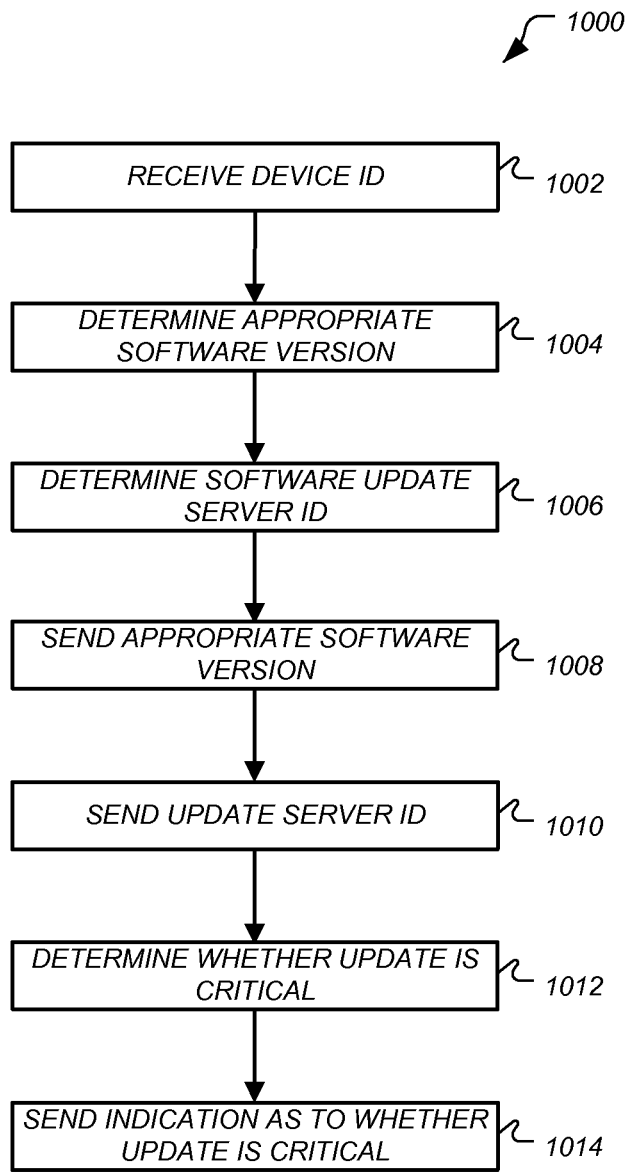
FIG. 10 is a flowchart of a process for a remote server (e.g., a registration server 512) to perform software updating according to an embodiment.

FIG. 10 is a flowchart of a process 1000 for a remote server (e.g., a registration server 512) to perform software updating according to an embodiment. In operation 1002, the registration server 512 receives a device identifier for the client device 520. Processing continues to operation 1004 where the appropriate software version of the client device 520 is determined. For example, the registration server 512 may compare the received device identifier to a device identifier/software version map (that maps device identifiers to software versions) to identify the appropriate software version for the client device 520. In operation 1006, the registration server 512 determines a target location of the software update server, which may be stored at the registration server 512, included in the device identifier/software version map, or otherwise accessed by the registration server 512. The registration server 512 may then, in operation 1008, communicate the information indicating the appropriate software version to the client device, and in operation 1010 communicate the target location of the software update server to the client device. In operation 1010, the registration server 512 determines whether the software update is critical. For example, the registration server 512 may compare the software version of the update to a software version/criticality map (that maps software versions to indicators indicating whether the software versions are critical or non-critical) to determine whether the software update is critical. The registration server 512 may then, in operation 1012, communicate, to the client device, an indication indicating whether the software update is critical.

It should be appreciated that the specific operations illustrated in FIG. 10 provide a particular process for a remote server to perform software updating according to various embodiments. Other sequences of operations may also be performed according to alternative embodiments. For example, alternative embodiments of the present invention may perform the operations outlined above in a different order. Moreover, the individual operations illustrated in FIG. 10 may include multiple sub-operations that may be performed in various sequences as appropriate to the individual operations. Furthermore, additional operations may be added or existing operations removed depending on the particular applications. One of ordinary skill in the art would recognize and appreciate many variations, modifications, and alternatives.

Figure 11:
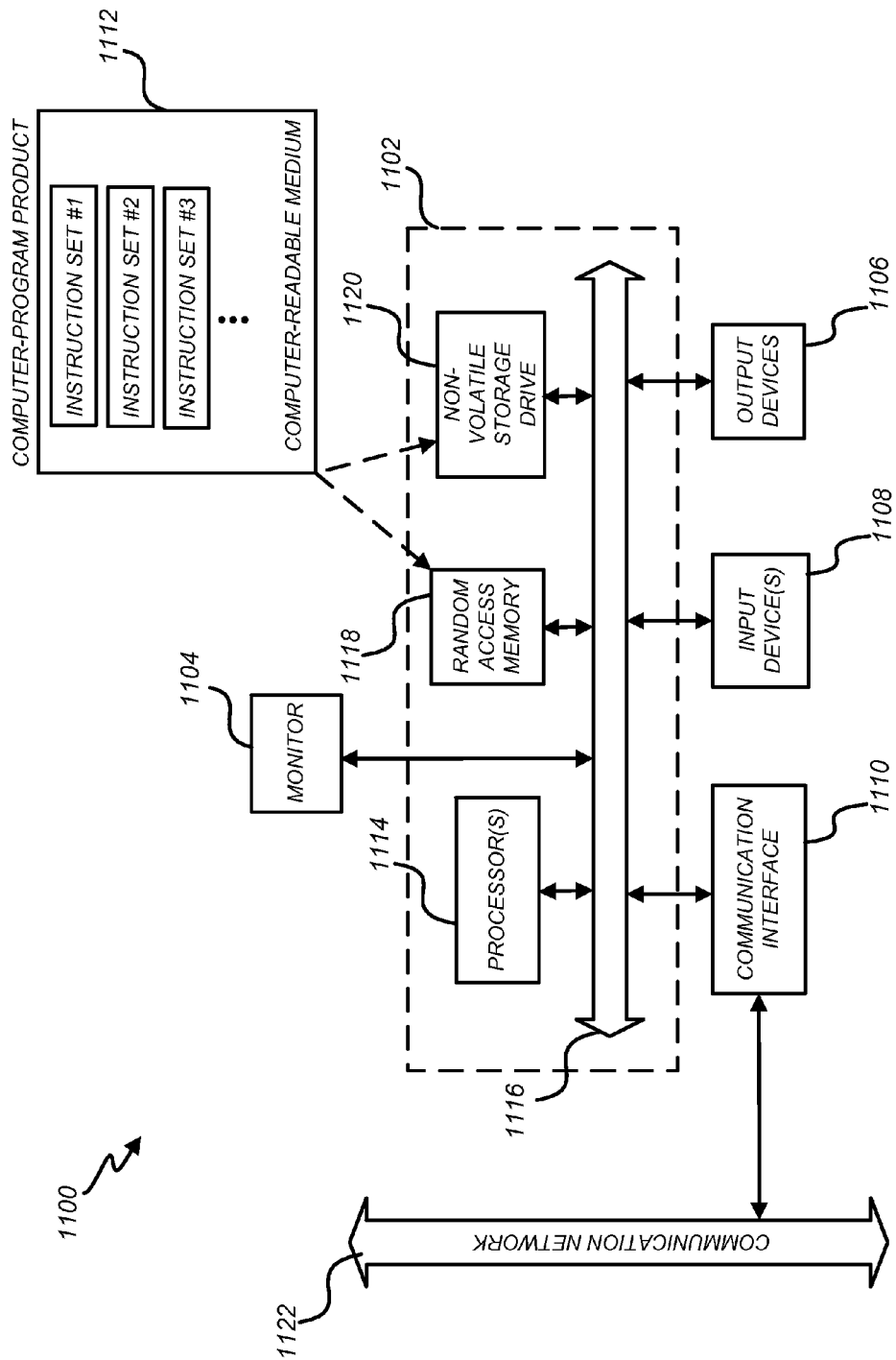
FIG. 11 is a block diagram of a special-purpose computer system according to an embodiment.

FIG. 11 is a block diagram of a special-purpose computer system 1100 according to an embodiment. For example, one or more of client device 100, elements of smart home environment 200, remote server 264, data processing server 307, client device 520, elements of remote server 510, or other electronic components described herein may implemented as a special-purpose computer system 1100. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof.

Special-purpose computer system 1100 comprises a computer 1102, a monitor 1104 coupled to computer 1102, one or more additional user output devices 1106 (optional) coupled to computer 1102, one or more user input devices 1108 (e.g., keyboard, mouse, track ball, touch screen) coupled to computer 1102, an optional communications interface 1110 coupled to computer 1102, and a computer-program product 1112 stored in a tangible computer-readable memory in computer 1102. Computer-program product 1112 directs system 1100 to perform the above-described methods. Computer 1102 may include one or more processors 1114 that communicate with a number of peripheral devices via a bus subsystem 1116. These peripheral devices may include user output device(s) 1106, user input device(s) 1108, communications interface 1110, and a storage subsystem, such as random access memory (RAM) 1118 and non-volatile storage drive 1120 (e.g., disk drive, optical drive, solid state drive), which are forms of tangible computer-readable memory.

Computer-program product 1112 may be stored in non-volatile storage drive 1120 or another computer-readable medium accessible to computer 1102 and loaded into memory 1118. Each processor 1114 may comprise a microprocessor, such as a microprocessor from Intel® or Advanced Micro Devices, Inc.®, or the like. To support computer-program product 1112, the computer 1102 runs an operating system that handles the communications of product 1112 with the above-noted components, as well as the communications between the above-noted components in support of the computer-program product 1112. Exemplary operating systems include Windows® or the like from Microsoft Corporation, Solaris® from Sun Microsystems, LINUX, UNIX, and the like.

User input devices 1108 include all possible types of devices and mechanisms to input information to computer system 1102. These may include a keyboard, a keypad, a mouse, a scanner, a digital drawing pad, a touch screen incorporated into the display, audio input devices such as voice recognition systems, microphones, and other types of input devices. In various embodiments, user input devices 1108 are typically embodied as a computer mouse, a trackball, a track pad, a joystick, wireless remote, a drawing tablet, a voice command system. User input devices 1108 typically allow a user to select objects, icons, text and the like that appear on the monitor 1104 via a command such as a click of a button or the like. User output devices 1106 include all possible types of devices and mechanisms to output information from computer 1102. These may include a display (e.g., monitor 1104), printers, non-visual displays such as audio output devices, etc.

Communications interface 1122 provides an interface to other communication networks and devices and may serve as an interface to receive data from and transmit data to other systems, WANs and/or the Internet. Embodiments of communications interface 1122 typically include an Ethernet card, a modem (telephone, satellite, cable, ISDN), a (asynchronous) digital subscriber line (DSL) unit, a FireWire interface, a USB interface, a wireless network adapter, and the like. For example, communications interface 1110 may be coupled to a computer network, to a FireWire® bus, or the like. In other embodiments, communications interface 1110 may be physically integrated on the motherboard of computer 1102, and/or may be a software program, or the like.

RAM 1118 and non-volatile storage drive 1120 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1118 and non-volatile storage drive 1120 may be configured to store the basic programming and data constructs that provide the functionality of various embodiments of the present invention, as described above.

Software instruction sets that provide the functionality of the present invention may be stored in RAM 1118 and non-volatile storage drive 1120. These instruction sets or code may be executed by the processor(s) 1114. RAM 1118 and non-volatile storage drive 1120 may also provide a repository to store data and data structures used in accordance with the present invention. RAM 1118 and non-volatile storage drive 1280 may include a number of memories including a main random access memory (RAM) to store of instructions and data during program execution and a read-only memory (ROM) in which fixed instructions are stored. RAM 1118 and non-volatile storage drive 1120 may include a file storage subsystem providing persistent (non-volatile) storage of program and/or data files. RAM 1118 and non-volatile storage drive 1120 may also include removable storage systems, such as removable flash memory.

Bus subsystem 1116 provides a mechanism to allow the various components and subsystems of computer 1102 communicate with each other as intended. Although bus subsystem 1116 is shown schematically as a single bus, alternative embodiments of the bus subsystem may utilize multiple busses or communication paths within the computer 1102.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The subject matter of this patent specification relates to the subject matter of the following commonly assigned applications, each of which is incorporated by reference herein: U.S. Ser. No. 13/269,501 filed Oct. 7, 2011; and U.S. Ser. No. 13/466,815 filed May 8, 2012.

While the principles of the present teachings have been described above in connection with specific apparatuses and methods, it is to be clearly understood that this description is made only by way of example and not as limitation on the scope of the present teachings.

What is claimed is:

1. An electronic device, comprising:
    a communications component configured to communicate with one or more electronic devices;
    a storage element configured to store computer software operable to control one or more functions of the electronic device; and
    a processor configured to cause the electronic device to perform operations including:
        receiving installation information indicative of whether installation of a software update would interrupt installation of the electronic device;
        receiving the software update from a software update device via the communications component;
        determining whether an installation of the electronic device is being performed;
        installing the software update prior to a completion of the installation of the electronic device if the installation information indicates that installation of the software update would not interrupt installation of the electronic device; and
        delaying installation of the software update until after the installation of the electronic device is complete if the installation information indicates that installation of the software update would interrupt installation of the electronic device.

2. The electronic device of claim 1, wherein the installation information is received from a registration device separate from the software update device.

3. The electronic device of claim 1, wherein the processor is further configured to delay reception of the software update until one or more pre-download conditions are satisfied.

4. The electronic device of claim 3, wherein the pre-download conditions include:
    the electronic device being in an awake mode; and
    the electronic device having sufficient battery charge if a power connection is unavailable.

5. The electronic device of claim 1, wherein the processor is further configured to delay installation of the software update until one or more pre-install conditions are satisfied.

6. The electronic device of claim 5, wherein the pre-install conditions include:
the electronic device being in an awake mode;
the electronic device having a sufficient battery charge if a power connection is unavailable;
a replaceable module of the electronic device being connected to a docking station of the electronic device;
a user interface of the electronic device not displaying information; and
an HVAC system coupled to the electronic device being in an inactive state.

7. The electronic device of claim 1, wherein the electronic device is selected from the group consisting of: a thermostat, a hazard detection unit, an entryway interface device, a light switch, a wall plug interface, and an appliance.

8. A computer-implemented method, comprising:
receiving, at an electronic device, installation information indicative of whether installation of a software update to computer software stored in a storage element of the electronic device would interrupt installation of the electronic device;
receiving the software update at the electronic device;
determining whether an installation of the electronic device is being performed;
installing the software update prior to a completion of the installation of the electronic device if the installation information indicates that installation of the software update would not interrupt installation of the electronic device; and
delaying installation of the software update until after the installation of the electronic device is complete if the installation information indicates that installation of the software update would interrupt installation of the electronic device.

9. The method of claim 8, wherein the storage element includes a primary partition and a secondary partition, and software operable to control one or more functions of the electronic device is provided on the primary partition.

10. The method of claim 9, further comprising:
copying the software update to the secondary partition;
rebooting the electronic device from the secondary partition; and
determining whether the reboot is successful.

11. The method of claim 10, further comprising:
determining that the reboot is successful;
copying the software update to the primary partition; and
rebooting the electronic device from the primary partition such that the electronic device is rebooted to incorporate the software update.

12. The method of claim 10, further comprising:
determining that the reboot is unsuccessful; and
rebooting the electronic device from the primary partition such that the electronic device is rebooted without incorporating the software update.

13. The method of claim 10, further comprising:
determining that the reboot is unsuccessful; and
communicating an error message to a user indicating that installation of the software update was unsuccessful.

14. The method of claim 10, further comprising:
disabling control of one or more elements of an HVAC system coupled to the electronic device;
installing the software update while control of the one or more elements of the HVAC system is disabled; and
enabling control of the one or more elements of the HVAC system after installing the software update.

15. A tangible non-transitory computer-readable storage medium including instructions that, when executed by one or more computer processors, cause the one or more computer processors to perform operations comprising:
receiving, at an electronic device, installation information indicative of whether installation of a software update to computer software stored in a storage element of the electronic device would interrupt installation of the electronic device;
receiving the software update at the electronic device;
determining whether an installation of the electronic device is being performed;
installing the software update prior to a completion of the installation of the electronic device if the installation information indicates that installation of the software update would not interrupt installation of the electronic device; and
delaying installation of the software update until after the installation of the electronic device is complete if the installation information indicates that installation of the software update would interrupt installation of the electronic device.

16. The storage medium of claim 15, further comprising instructions that, when executed by the computer processor, cause the computer processor to perform operations comprising:
determining whether one or more elements of an HVAC system coupled to the electronic device are in an active state; and
delaying installation of the software update when it is determined that one or more elements of the HVAC system are in an active state, wherein installation is delayed until the one or more elements of the HVAC system are in an inactive state.

17. The storage medium of claim 15, further comprising instructions that, when executed by the computer processor, cause the computer processor to perform operations comprising:
determining whether a display of the electronic device is active; and
delaying installation of the software update until the display of the electronic device is inactive.

18. The storage medium of claim 15, further comprising instructions that, when executed by the computer processor, cause the computer processor to perform operations comprising:
determining whether the electronic device is in an awake mode; and
delaying installation of the software update until the electronic device is in a non-awake mode.

19. The storage medium of claim 15, further comprising instructions that, when executed by the computer processor, cause the computer processor to perform operations comprising:
determining whether the electronic device has a battery charge sufficient to install the software update; and
delaying installation of the software update until the electronic device has a battery charge sufficient to install the software update.

20. The storage medium of claim 15, further comprising instructions that, when executed by the computer processor, cause the computer processor to perform operations comprising:

determining whether a replaceable module of the electronic device is connected to a docking station of the electronic device; and delaying installation of the software update until the replaceable module is connected to the docking station.

* * * * *